(12) United States Patent
Tanigawa

(10) Patent No.: US 6,999,130 B2
(45) Date of Patent: Feb. 14, 2006

(54) LUMINANCE SIGNAL/CHROMINANCE SIGNAL SEPARATION DEVICE, AND LUMINANCE SIGNAL/CHROMINANCE SIGNAL SEPARATION METHOD

(75) Inventor: Satoru Tanigawa, Kawanishi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 544 days.

(21) Appl. No.: 10/268,925

(22) Filed: Oct. 11, 2002

(65) Prior Publication Data

US 2003/0071921 A1   Apr. 17, 2003

(30) Foreign Application Priority Data

Oct. 12, 2001   (JP)   .............................. 2001-314880

(51) Int. Cl.
   *H04N 9/77*   (2006.01)

(52) U.S. Cl. ..................................... 348/663; 348/664

(58) Field of Classification Search ................ 348/663, 348/664, 665, 666, 667; H04N 9/77, 9/78
See application file for complete search history.

(56) References Cited

U.S. PATENT DOCUMENTS

| 5,249,040 A | 9/1993 | Sugiyama ..................... 358/31 |
| 5,786,872 A * | 7/1998 | Miyazaki et al. ........... 348/669 |
| 6,809,778 B1 * | 10/2004 | Shibutani et al. ........... 348/667 |

FOREIGN PATENT DOCUMENTS

| JP | 63-206091 | 8/1988 |
| JP | 6-303636 | 10/1994 |
| JP | 2001-95010 | 4/2001 |

\* cited by examiner

Primary Examiner—Sherrie Hsia
(74) Attorney, Agent, or Firm—Steptoe & Johnson LLP

(57) ABSTRACT

A luminance signal/chrominance signal separation apparatus is provided with a detector for detecting diagonal components of a luminance signal from a composite video signal, wide-band pass filters, and narrow-band pass filters, wherein band pass filters to be connected to a three-line chrominance separation circuit are selected according to the amount of diagonal components of the luminance signal, thereby reducing cross color and improving resolution.

21 Claims, 14 Drawing Sheets

LUMINANCE SIGNAL/CHROMINANCE SIGNAL SEPARATION DEVICE, AND LUMINANCE SIGNAL/CHROMINANCE SIGNAL SEPARATION METHOD

FIELD OF THE INVENTION

The present invention relates to a luminance signal/chrominance signal separation device and a luminance signal/chrominance signal separation method, which are used for separating a luminance signal and a chrominance signal from a composite video signal.

BACKGROUND OF THE INVENTION

In recent years, as television receivers have been increased in size and enhanced in image quality, enhancement in performance of a luminance signal/chrominance signal separation device for separating a luminance signal and a chrominance signal from a composite video signal has increasingly become important.

Hereinafter, a conventional luminance signal/chrominance signal separation device will be described.

FIG. 13 is a block diagram illustrating a conventional luminance signal/chrominance signal separation device.

In FIG. 13, reference numerals 601 and 602 denote line memories each having a storage capacity for one line of a video signal; numerals 603, 604, and 605 denote filters which pass predetermined band components; numerals 606 and 607 denote inversion circuits for inverting input signals; numerals 608, 609, 610, 615, 618, 619, and 620 denote minimum value circuits each for outputting a minimum value between two input signals; numerals 611, 612, 613, 614, and 621 denote maximum value circuits each for outputting a maximum value between two input signals; numeral 616 denotes an addition circuit for adding two input signals; numeral 617 denotes a one-half circuit for outputting a one-half value of an input signal; numeral 623 denotes a three-line chrominance separation circuit comprising the above-mentioned components 606~621; and numeral 622 denotes a subtracter for subtracting an output signal of the three-line chrominance separation circuit 623 from an output signal of the line memory 601.

The line memories 601 and 602 are connected in series, and a composite video signal S601 from which a luminance signal and a chrominance signal are to be separated is input to the line memory 601. The composite video signal S601 is input to the filter 603, an output signal S602 from the line memory 601 is input to the filter 604, and an output signal S603 from the line memory 602 is input to the filter 605.

In the three-line chrominance separation circuit 623, output signals S604 and S606 from the filters 603 and 605 are input to the inversion circuits 606 and 607, respectively. An output signal S607 from the inversion circuit 606 and an output signal S605 from the filter 604 are input to the minimum value circuit 608 and to the maximum value circuit 612. An output signal S608 from the inversion circuit 607 and the output signal S605 from the filter 604 are input to the minimum value circuit 609 and to the maximum value circuit 613.

Output signals S609 and S610 from the minimum value circuits 608 and 609 are input to the minimum value circuit 610 and to the maximum value circuit 611, and output signals S613 and S614 from the maximum value circuits 612 and 613 are input to the maximum value circuit 614 and to the minimum value circuit 615, respectively.

An output signal S611 from the minimum value circuit 610 and an output signal S615 from the maximum value circuit 614 are input to the adder 616.

An output signal S617 from the adder 616 is input to the one-half circuit 617. An output signal S612 from the maximum value circuit 611 and an output signal S618 from the one-half circuit 617 are input to the minimum value circuit 618. An output signal S616 from the minimum value circuit 615 and the output signal S618 from the one-half circuit 617 are input to the minimum value circuit 619. The output signal S612 from the maximum value circuit 611 and the output signal S616 from the minimum value circuit 615 are input to the minimum value circuit 620. Output signals S619, S620, and S621 from the minimum value circuits 618, 619, and 620 are input to the maximum value circuit 621.

Further, the output signal S602 from the line memory 601 and an output signal S622 from the maximum value circuit 621 of the three-line chrominance separation circuit 623 are input to the subtracter 622.

Hereinafter, the operation of the luminance signal/chrominance signal separation device so constituted will be described.

A composite video signal S601, which is obtained by A/D converting an NTSC signal, is input to the line memories 601 and 602, thereby obtaining a composite video signal S602 that is delayed by one line in the line memory 601, and a composite video signal S603 that is delayed by another one line in the line memory 601. Then, these composite video signals S601, S602, and S603 are input to the filters 603, 604, and 605, respectively, thereby obtaining composite video signals S604, S605, and S606 that are band-restricted by these filters 603, 604, and 605, respectively.

Since the phase of the chrominance signal is inverted at 180° for every line, the composite video signal S605 is assumed as a center line, and the phases of the composite video signals S604 and S606 in lines before and after the center line are inverted by the inversion circuits 606 and 607 to obtain signals S607 and S608, thereby matching the phases of the chrominance signals among the three lines. Thereafter, an intermediate value between a maximum value and a minimum value among the three input signals S607, S605, and S608 is detected utilizing correlation in the vertical direction among the three lines, by a section comprising the minimum value circuits 608, 609, 610, 615, 618, 619, and 620, the maximum value circuits 611, 612, 613, 614, and 621, the adder 616, and the one-half circuit 617, which are included in the chrominance separation circuit 623, and this intermediate value is regarded as a chrominance signal to be output as an output signal S622. Therefore, when there is correlation among the chrominance components included in the composite video signals S601, S602, and S603, the chrominance signal can be correctly separated. Then, the chrominance signal S622 is subtracted from the composite video signal S602 by the subtracter 622 to obtain a luminance signal S623.

The conventional luminance signal/chrominance signal separation device constituted as described above can correctly separate the luminance signal and the chrominance signal from the composite video signal when there is line correlation in the vertical direction. However, when a luminance signal that is imaged as diagonal stripes is input, the line correlation in the vertical direction is lowered.

FIG. 14 is a diagram illustrating timing charts of the respective signals in a case where diagonal stripes are input to the conventional luminance signal/chrominance signal separation device.

With reference to FIG. 14, S601 indicates an inputted composite video signal, S602 indicates the composite video signal that is delayed by one line, and S603 indicates the composite video signal that is delayed by two lines, in a state where diagonal stripes of a luminance signal having a frequency component in the vicinity of 3.58 MHz are input. Further, S604, S605, and S606 indicate band-restricted video signals which are obtained by filtering the composite video signals S601, S602, and S603 so as to remove low-frequency components thereof, and pass only signal components having a frequency band in the vicinity of 3.58 MHz.

Further, S607 and S608 indicate video signals which are obtained by inverting the signals S604 and S606 in the lines above and beneath the signal S605 in the center line to match the phases of these signals. Furthermore, S609~S621 indicate results obtained in the middle of processing, more specifically, which are obtained by passing the signals S605, S607, and S608 through the maximum value circuits and the minimum value circuits in the three-line chrominance separation circuit 623, and S622 indicates an output result of a chrominance signal that is detected by selecting a maximum value and a minimum value.

In this way, when the diagonal stripes are input, signal components are output from the output terminal of the chrominance signal S622 of the three-line chrominance separation circuit 623 although the original chrominance signal is not output. That is, the inputted luminance signal components leak into the chrominance signal components to be output, whereby cross color is generated in the position where the diagonal stripes are input. Further, since the luminance signal S623 is obtained by subtracting the chrominance signal S622 from the composite video signal S602, the leakage of the luminance signal components into the chrominance signal components causes degraded resolution.

SUMMARY OF THE INVENTION

The present invention is made to solve the above-mentioned problems and has for its object to provide a luminance signal/chrominance signal separation device and a luminance signal/chrominance signal separation method, that can reduce cross color which is caused by leakage of luminance signal components into chrominance signal components when luminance signals having correlation in the diagonal direction are input, and that can improve resolution in the diagonal direction.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a luminance signal/chrominance signal separation device comprises: a chrominance separation unit for separating a chrominance signal from an inputted composite video signal; a luminance separation unit for separating a luminance signal by subtracting the chrominance signal which is separated by the chrominance separation unit, from the composite video signal; a luminance diagonal component detection unit for detecting diagonal components of the luminance signal from the composite video signal; and a passband switching unit for switching a passband of a band restriction filter which is provided at an input stage of the chrominance separation unit, according to a result of detection by the luminance diagonal component detection unit. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a second aspect of the present invention, in the luminance signal/chrominance signal separation device according to the first aspect, the band restriction filter comprises a broad-band pass filter having a broad passband, and a narrow-band pass filter having a narrow passband; and the passband switching unit selects the narrow-band pass filter when the luminance signal has many diagonal components, and selects the broad-band pass filter when the luminance signal has few diagonal components. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a third aspect of the present invention, in the luminance signal/chrominance signal separation device according to the second aspect, the band restriction filter comprises a broad-band pass filter having a broad passband, and a narrow-band pass filter having a narrow passband, which filters are connected in series in this order; and the passband switching unit selects either an output signal from the broad-band pass filter or an output signal from the narrow-band pass filter, thereby switching band pass characteristics of the band restriction filter. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a fourth aspect of the present invention, in the luminance signal/chrominance signal separation device according to the first aspect, the chrominance separation unit includes first and second inversion units for inverting composite video signals in lines before and after a composite video signal in a reference line to be a reference when performing chrominance separation, respectively; and an intermediate value detection unit for detecting an intermediate value between a maximum value and a minimum value among output signals from the first and second inversion units and the composite video signal in the reference line, and outputting the intermediate value as a chrominance signal. Therefore, specific constitution of the color separation unit can be provided. Further, when luminance signal components in the diagonal direction, such as diagonal stripes, are not input to the chrominance separation unit, transient of color is secured by using the broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a fifth aspect of the present invention, in the luminance signal/chrominance signal separation device according to the fourth aspect, the intermediate value detection unit includes a first minimum value unit and a first maximum value unit for detecting a minimum value and a maximum value between the output signal from the first inversion unit and the composite video signal in the reference line; a second minimum value unit and a second maximum value unit for detecting a minimum value and a maximum value between the output signal from the second inversion unit and the composite video signal in the reference line; a third minimum value unit and a third maximum value unit for detecting a minimum value and a maximum value between an output signal from the first minimum value unit and an output signal from the second minimum value unit; a fourth minimum value unit and a fourth maximum value unit for detecting a minimum value and a maximum value between an output signal from the first maximum value unit and an output signal from the second maximum value unit; a first addition unit for adding an output signal from the third minimum value unit and an output signal from the fourth maximum value unit; a one-half unit for halving an output signal from the first addition unit; a fifth minimum value unit for detecting a minimum value between an output signal from the third maximum value unit and an output signal from the one-half unit; a sixth minimum value unit for detecting a minimum value between an output signal from the fourth minimum value unit and the output signal from the one-half unit; a seventh minimum value unit for detecting a minimum value between the output signal from the third maximum value unit and the output signal from the fourth minimum value unit; and a fifth maximum value unit for detecting a maximum value among output signals from the fifth, sixth, and seventh minimum value units, thereby separating a chrominance signal. Therefore, specific constitution of the color separation unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a sixth aspect of the present invention, in the luminance signal/chrominance signal separation device according to the first aspect, the luminance diagonal component detection unit includes a diagonal difference detection unit for detecting a diagonal difference that is the size of a difference between signal components which deviate from each other in the diagonal direction, in composite video signals in lines before and after a reference line to be a reference when performing chrominance separation; and a diagonal component judgement unit for judging the presence/absence of luminance diagonal components by comparing the diagonal difference detected by the diagonal difference detection unit with a first judgement level. Therefore, specific constitution of the luminance diagonal component detection unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a seventh aspect of the present invention, in the luminance signal/chrominance signal separation device according to the sixth aspect, the diagonal difference detection unit includes second and third addition units for adding the composite video signal in the reference line to the composite video signals in the lines before and after the reference line, respectively; first and second delay units for delaying data outputted from the first and second addition units, respectively; first and second difference units for taking differences in data between the outputs of the second and third addition units, and the outputs of the second and first delay units, respectively; and first and second absolute value units for taking absolute values of the difference values obtained by the first and second difference units, respectively; and the diagonal component judgement unit includes first and second comparators for comparing the first and second absolute value levels obtained by the first and second absolute value units, with the first judgement level, respectively; and a first logic unit for calculating a logical OR of the first and second comparison results obtained by the first and second comparators, respectively, thereby detecting diagonal components of the luminance signal included in the composite video signal. Therefore, specific constitution of the luminance diagonal component detection unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to an eighth aspect of the present invention, the luminance signal/chrominance signal separation device according to the first aspect further comprises a vertical luminance correlation detection unit for detecting luminance signal components in the vertical direction between lines before and after a reference line to be a reference when the chrominance separation unit performs chrominance separation on the inputted composite video signal; and when the vertical luminance correlation detection unit judges that a correlation of the luminance signal component between the lines is high, the passband of the band restriction filter is not narrowed. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation in the vertical direction is detected. Thereby, detection of luminance correlation in the diagonal direction is accurately carried out, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a ninth aspect of the present invention, in the luminance signal/chrominance signal separation device according to the eighth aspect, the vertical luminance correlation detection unit includes a vertical difference detection unit for detecting a vertical difference that is the size of a difference between signal components which deviate from each other in the vertical direction, in the composite video signals in the lines before and after the reference line; and a vertical correlation judgement unit for judging the presence/absence of a luminance vertical correlation by comparing the vertical difference detected by the vertical difference detection unit with a second judgement level. Therefore, specific construction of the vertical luminance correlation detection unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation in the vertical direction is detected. Thereby, detection of luminance correlation in the diagonal direction is accurately carried out, and the inputted video signal passing through the filter is reduced when correlation in the diagonal direction is detected, whereby cross color in the chrominance signal to be output can be reduced with less malfunction. Further, also in the luminance signal to be output, resolution in the diagonal direction can reliably be improved.

According to a tenth aspect of the present invention, in the luminance signal/chrominance signal separation device according to the ninth aspect, the vertical difference detection unit includes a third difference unit for taking a difference between the signals in the lines before and after the reference line; and a third absolute value unit for taking an absolute value of an output signal from the third difference unit; and the vertical correlation judgement unit includes a third comparator for comparing an output signal from the third absolute value unit with the second judgement level, thereby detecting a correlation in the vertical direction of the luminance signal included in the composite video signal. Therefore, specific construction of the vertical luminance correlation detection unit can be provided. Further, when luminance signal components in the diagonal direction, such as diagonal stripes, are not input to the chrominance separation unit, transient of color is secured by using a broadband pass filter. On the other hand, when luminance signal components in the diagonal direction, such as diagonal stripes, are input to the chrominance separation unit, the passband of the band restriction filter is switched so as to be narrow, except when luminance correlation in the vertical direction is detected. Thereby, detection of luminance correlation in the diagonal direction is accurately carried out, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to an eleventh aspect of the present invention, the luminance signal/chrominance signal separation device according to the eighth aspect further comprises a second logic unit for calculating a logical AND between a negative logic of a detection result of the vertical luminance correlation detection unit and a positive logic of a detection result of the luminance diagonal component detection unit, and outputting the logical AND signal as a switching control signal to the passband switching unit, instead of the detection result of the luminance diagonal component detection unit. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation in the vertical direction is detected. Thereby, detection of luminance correlation in the diagonal direction is accurately carried out, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a twelfth aspect of the present invention, the luminance signal/chrominance signal separation device according to the eighth aspect further comprises a vertical chrominance correlation detection unit for detecting chrominance signal components in the vertical direction between the lines before and after the reference line; and when a correlation of the chrominance signal between the lines is high, the passband of the band restriction filter is not narrowed. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a thirteenth aspect of the present invention, in the luminance signal/chrominance signal separation device according to the twelfth aspect, the vertical chrominance correlation detection unit includes third and fourth inversion units for inverting the composite video signals in the lines before and after reference line, respectively; an inter-adjacent-line vertical difference detection unit for detecting an inter-adjacent-line vertical component that is the size of a difference between signal components which deviate from each other in the vertical direction, in the composite video signals in the reference line and the lines before and after the reference line; and an inter-adjacent-line vertical correlation judgement unit for judging the presence/absence of a vertical chrominance correlation by comparing the inter-adjacent-line vertical difference that is detected by the inter-adjacent-line vertical difference detection unit with a third judgement level. Therefore, specific construction of the vertical chrominance correlation detection unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a fourteenth aspect of the present invention, in the luminance signal/chrominance signal separation device according to the thirteenth aspect, the inter-adjacent-line vertical difference detection unit includes fourth and fifth difference units for obtaining differences between the signal in the reference line and output signals from the third and fourth inversion units, respectively; and fourth and fifth absolute value units for taking absolute values of output signals from the fourth and fifth difference units, respectively; and the inter-adjacent-line vertical correlation judgement unit includes fourth and fifth comparators for comparing output signals from the fourth and fifth absolute value units with the third judgement level, respectively; and a third logic unit for calculating a logical OR of the fourth and fifth comparison results obtained by the fourth and fifth comparators, thereby detecting a vertical correlation of the chrominance signal included in the composite video signal. Therefore, specific construction of the vertical chrominance correlation detection unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a fifteenth aspect of the present invention, the luminance signal/chrominance signal separation device according to the twelfth aspect further comprises, instead of the second logic unit, a fourth logic unit for calculating a logical AND among a negative logic of a detection result of the vertical luminance correlation detector, a negative logic of a detection result of the vertical chrominance correlation detector, and a positive logic of a detection result of the luminance diagonal component detection unit, and outputting the logical AND signal as a switching control signal to the passband switching unit, instead of the output signal from the second logic unit. Therefore, specific construction of the vertical chrominance correlation detection unit can be provided. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched by the fourth logic unit so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a sixteenth aspect of the present invention, in the luminance signal/chrominance signal separation device according to the twelfth aspect, the band restriction filter is provided in an output stage of the chrominance separation unit, instead of providing it in the input stage thereof. Therefore, the circuit scale of the band restriction filter is reduced. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a seventeenth aspect of the present invention, in the luminance signal/chrominance signal separation device according to the sixteenth aspect, the band restriction filter comprises a broad-band pass filter having a broad passband, and a narrow-band pass filter having a narrow chrominance passband; the broad-band pass filter is provided at an input side of the chrominance separation unit, and the narrow-band pass filter is provided at an output side of the chrominance separation unit; and the passband switching unit selects either an output of the chrominance separation unit, which has passed through the narrow-band pass filter, or an output of the chrominance separation unit, thereby switching the band pass characteristics of the band restriction filter. Therefore, the circuit scale of the band restriction filter is reduced. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to an eighteenth aspect of the present invention, the luminance signal/chrominance signal separation method comprises: detecting diagonal components of a luminance signal from an inputted composite video signal; switching a passband of a band restriction filter that is provided at an input stage of a chrominance signal separation unit which separates a chrominance signal according to a detection result of the luminance diagonal components; separating the chrominance signal from the composite video signal whose passband is switched; and separating the luminance signal by subtracting the separated chrominance signal from the composite video signal. Therefore, when luminance signal components in the diagonal direction, such as diagonal stripes, are not input to the chrominance separation unit, transient of color is secured by using a broadband pass filter. On the other hand, when luminance signal components in the diagonal direction, such as diagonal stripes, are input to the chrominance separation unit, the passband of the band restriction filter is switched so as to be narrow, whereby the inputted video signal passing through the filter is reduced, resulting in a reduction in cross color in the chrominance signal to be output. Further, resolution in the diagonal direction in the luminance signal to be output can be improved.

According to a nineteenth aspect of the present invention, the luminance signal/chrominance signal separation method comprises: detecting diagonal components and vertical components of a luminance signal from an inputted composite video signal; switching a passband of a band restriction filter provided in an input stage of a chrominance signal separation unit for separating a chrominance signal according to the result of detection of the luminance diagonal components and luminance vertical components; separating the chrominance signal from the composite signal whose passband is switched; and separating the luminance signal by subtracting the separated chrominance signal from the composite video signal. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation in the vertical direction is detected. Thereby, detection of luminance correlation in the diagonal direction is accurately carried out, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a twentieth aspect of the present invention, a luminance signal/chrominance signal separation method comprises: detecting diagonal components and vertical components of a luminance signal, and chrominance components in the vertical direction, from an inputted composite video signal; switching a passband of a band restriction filter in an input stage of a chrominance signal separation unit for separating a chrominance signal according to the result of detection of the luminance diagonal components, luminance vertical components, and chrominance components in the vertical direction; separating the chrominance signal from the composite video signal whose passband is switched; and separating the luminance signal by subtracting the separated chrominance signal from the composite video signal. Therefore, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

According to a twenty-first aspect of the present invention a luminance signal/chrominance signal separation method comprises: detecting diagonal components and vertical components of a luminance signal, and chrominance components in the vertical direction, from an inputted composite video signal; switching a passband of a band restriction filter provided at an output stage of a chrominance signal separation unit for separating a chrominance signal according to the result of detection of the luminance diagonal components, luminance vertical components, and chrominance components in the vertical direction; separating a chrominance signal whose passband is switched, from the composite video signal; and separating the luminance signal by subtracting the separated chrominance signal from the composite video signal. Therefore, the circuit scale of the band restriction filter is reduced. Further, when luminance signal components in the diagonal direction, such as diagonal stripes, are not input to the chrominance separation unit, transient of color is secured by using a broad-band pass filter. On the other hand, when luminance signal components in the diagonal direction, such as diagonal stripes, are input to the chrominance separation unit, the passband of the band restriction filter is switched so as to be narrow, except when luminance correlation and chrominance correlation in the vertical direction are detected. Thereby, detection of luminance correlation in the diagonal direction is carried out with higher accuracy, and the inputted video signal passing through the filter is reduced when correlation in the diagonal direction is detected, whereby cross color in the chrominance signal to be output can be reduced with less malfunction. Further, resolution in the diagonal direction in the luminance signal to be output can be reliably improved.

DETAILED DESCRIPTION OF THE PREFERRED EMBODIMENTS

[Embodiment 1]

A first embodiment of the present invention corresponds to claims 1~7 and 18. In this first embodiment, it is detected whether a luminance signal includes diagonal components or not. When the luminance signal includes diagonal components, a signal to be separated as a chrominance signal is not a chrominance signal any more. So, the width of passband of a band-pass filter is narrowed to reduce the output amplitude of the chrominance signal, whereby an amplitude difference (contrast) is given to the luminance signal that is obtained by subtracting the output chrominance signal from the composite video signal, resulting in a high-contrast image.

Hereinafter, the first embodiment of the present invention will be described with reference to the drawings.

Figure 1:
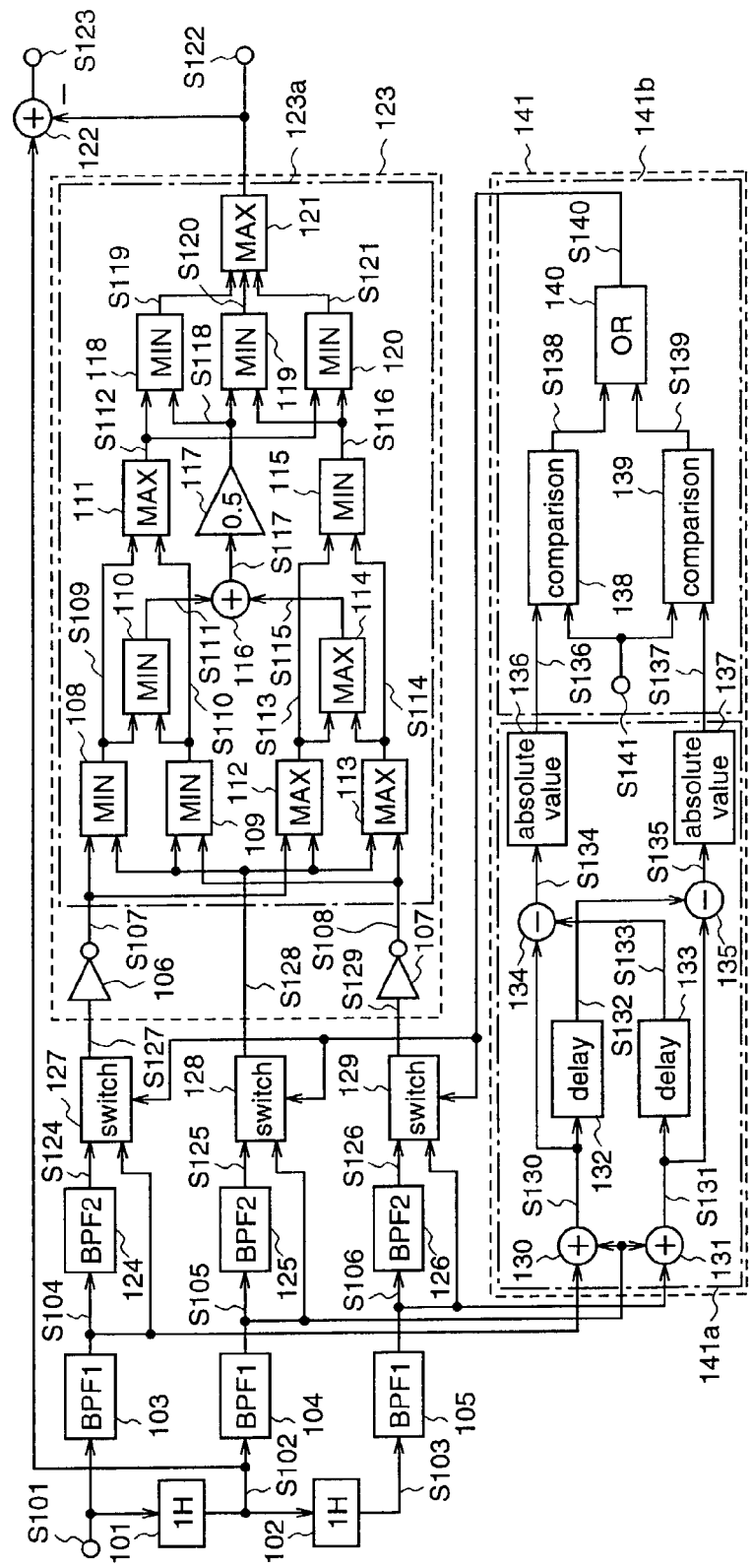
FIG. 1 is a block diagram illustrating the construction of a luminance signal/chrominance signal separation device according to a first embodiment of the invention.

FIG. 1 is a block diagram illustrating a luminance signal/chrominance signal separation device according to the first embodiment of the invention.

In FIG. 1, reference numerals 101 and 102 denote line memories each for delaying a signal by one horizontal period; numerals 103, 104, and 105 denote band pass filters 1 (broad-band pass filters) each for passing a predetermined band component; and numeral 123 denotes a three-line chrominance separation circuit (chrominance separation unit) for separating a chrominance signal from an inputted composite video signal. In the three-line chrominance separation circuit 123, numerals 106 and 107 denote inversion circuits (first and second inversion units) for inverting input signals; numerals 108, 109, 110, 115, 118, 119, and 120 denotes minimum value circuits (first, second, third, fourth, fifth, sixth, and seventh minimum value units) each for outputting a minimum value between two input signals; numerals 111, 112, 113, 114, and 121 denote maximum value circuits (third, first, second, fourth, and fifth maximum value units) each for outputting a maximum value between two input signals; numeral 116 denotes an adder (first addition unit) for adding two input signals; and numeral 117 denotes a one-half circuit (one-half unit) for outputting a one-half value of an input signal. Further, reference numeral 122 denotes a subtracter (luminance separation unit) for subtracting an output signal of the three-line chrominance separation circuit 123 from an output signal of the line memory 101 to separate a luminance signal. These components are identical to the components of the conventional device which are assigned with 601~623, and are connected in the same way as described for the conventional device except that the output signals from the band pass filters 103, 104, and 105 are not directly input to the three-line chrominance separation circuit 123. Further, the components of the three-line chrominance separation circuit 123 except the inversion circuits 106 and 107 serve as an intermediate value detection unit 123a for detecting an intermediate value between a maximum value and a minimum value among the output signals from the first and second inversion circuits and the composite video signal in a reference line, and outputting the detected intermediate value as a chrominance signal.

Reference numerals 124, 125, and 126 denote band pass filters 2 (narrow-band pass filters) to which output signals S104, S105, and S106 from the band pass filters 103, 104, and 105 are input. Reference numerals 127, 128, and 129 denote switching circuits (passband switching units). The switching circuit 127 selects one of the output signals from the band pass filters 103 and 124, the switching circuit 128 selects one of the output signals from the band pass filters 104 and 125, and the switching circuit 129 selects one of the output signals from the band pass filters 105 and 126. The band pass filters 124, 125, 126, and the switching circuits 127, 128, 129 are placed between the band pass filters 103, 104, 105, and the three-line chrominance separation circuit 123.

Furthermore, reference numerals 130 and 131 denote addition circuits (second and third addition units), numerals 132 and 133 denote unit-time delay circuits (first and second delay units), numerals 134 and 135 denote subtracters (first and second difference units), numerals 136 and 137 denote absolute value circuits (first and second absolute value units), numerals 138 and 139 denote comparison circuits (first and second comparison units), numeral 140 denotes a logic circuit (first logic unit), and numeral 141 denotes a luminance diagonal correlation detection circuit (luminance diagonal component detection unit) comprising the components 130~140, which detects diagonal components of the luminance signal from the composite video signal.

In the luminance diagonal correlation detection circuit 141, the addition circuit 130 adds an output signal S104 from the BPF 103 and an output signal S105 from the BPF 104, and the addition circuit 131 adds an output signal S105 from the BPF 104 and an output signal S106 from the BPF 105. The delay circuit 132 delays an output signal S130 from the addition circuit 130 by a predetermined delay time, and the delay circuit 133 delays an output signal S131 from the addition circuit 131 by a predetermined delay time. The subtracter 134 subtracts an output signal S133 of the delay circuit 133 from the output signal S130 of the adder 130, and the subtracter 135 subtracts an output signal S132 of the delay circuit 132 from the output signal S131 of the adder 131. The absolute value circuits 136 and 137 calculate the absolute values of an output signal S134 of the subtracter 134 and an output signal S135 of the subtracter 135, and output the absolute values as output signals S136 and S137, respectively. Reference numeral 141a denotes a diagonal difference detection unit comprising these components 130~137. The diagonal difference detection unit 141a detects a diagonal difference that is the size of a difference between signal components which deviate from each other in the diagonal direction, in the composite video signals in the lines before and after the reference line to be a reference when performing chrominance separation.

The comparator 138 compares an output signal S136 from the absolute value circuit 136 with a set value signal S141, and the comparator 139 compares an output signal S137 from the absolute value circuit 137 with a judgement level (first judgement level) S141. The logic circuit 140 outputs a logical OR signal S140 that is obtained between an output signal S138 from the logic circuit 138 and an output signal S139 from the comparator 139, as a switching signal for the switches 127~129. Reference numeral 141b denotes a vertical correlation judgement unit comprising these components 138~140, which compares the vertical difference detected by the vertical difference detection unit 141a with a second judgement level, thereby judging the presence/absence of vertical luminance correlation.

Figure 12:
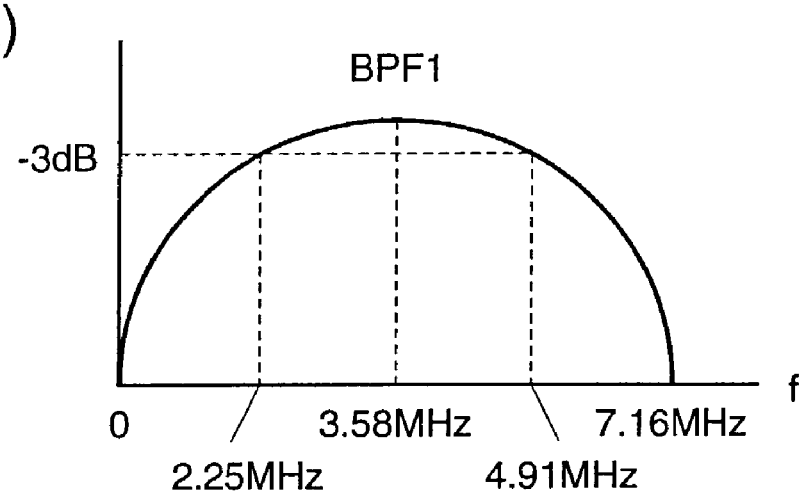
FIGS. 12(a)–12(c) are diagrams illustrating characteristics of band pass filters employed in the luminance signal/chrominance signal separation device according to the embodiments of the invention.
Figure 12:
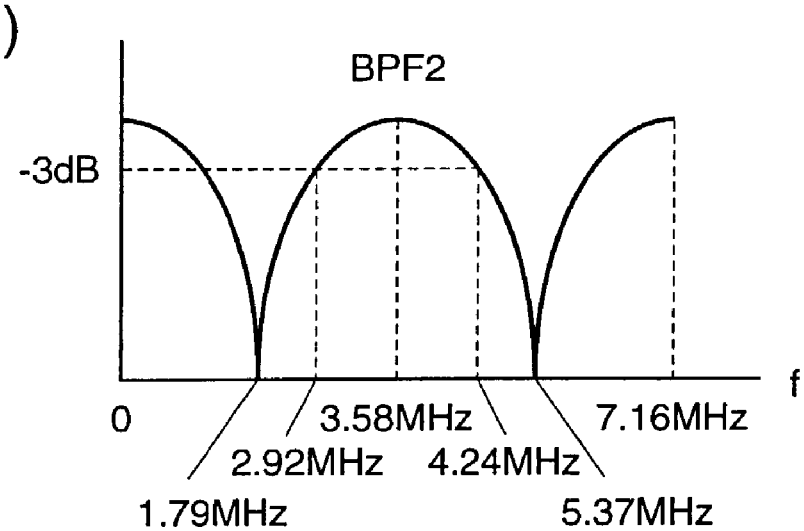
Figure 12:
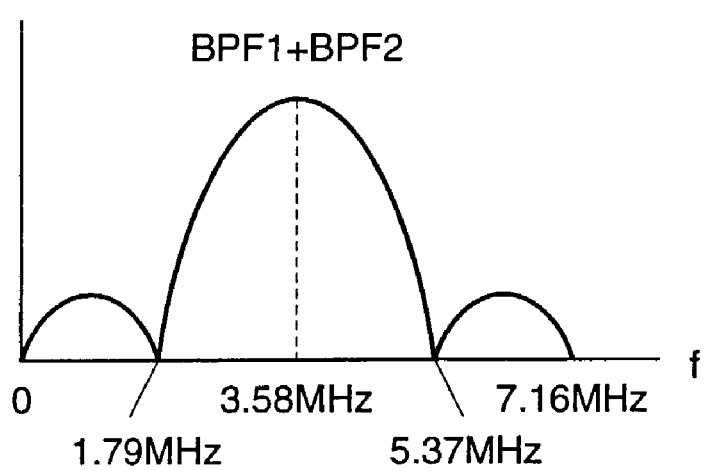
Figure 13:
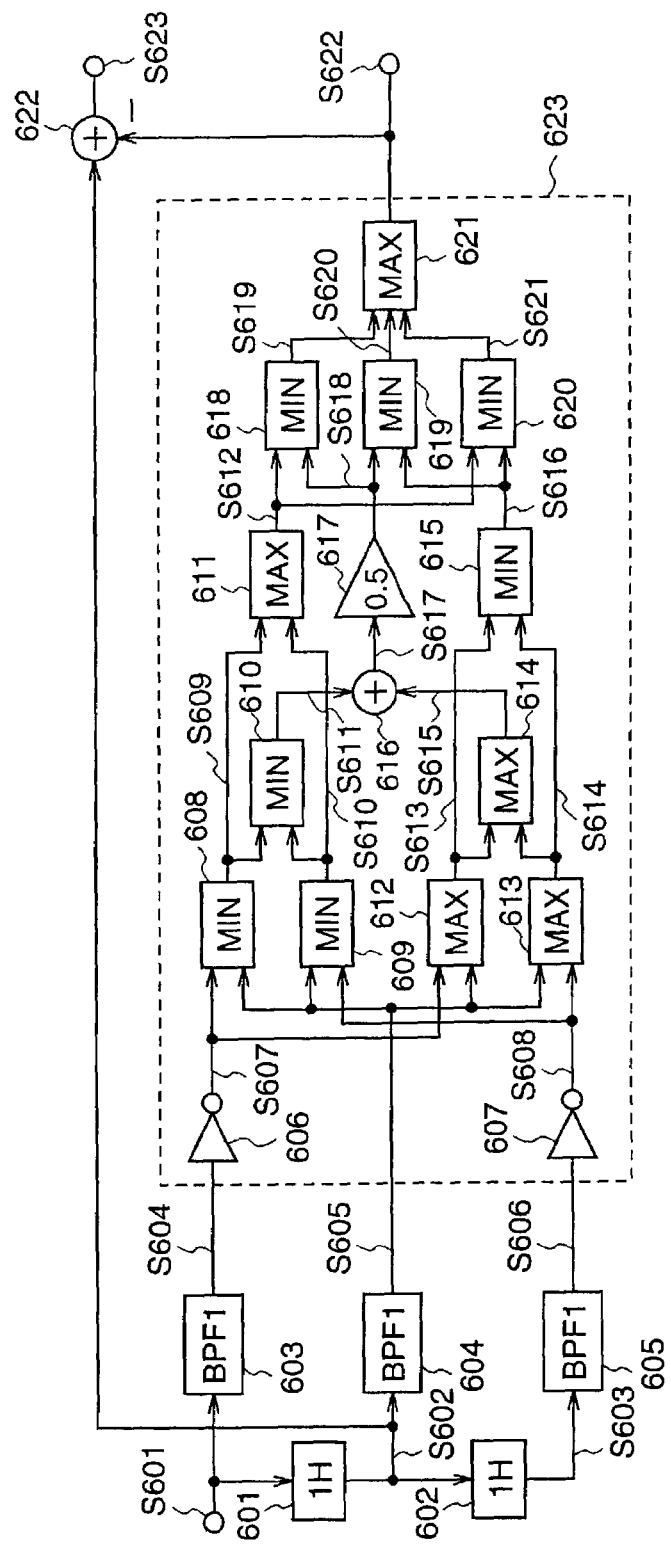
FIG. 13 is a block diagram illustrating the construction of a conventional luminance signal/chrominance signal separation device.
Figure 14:
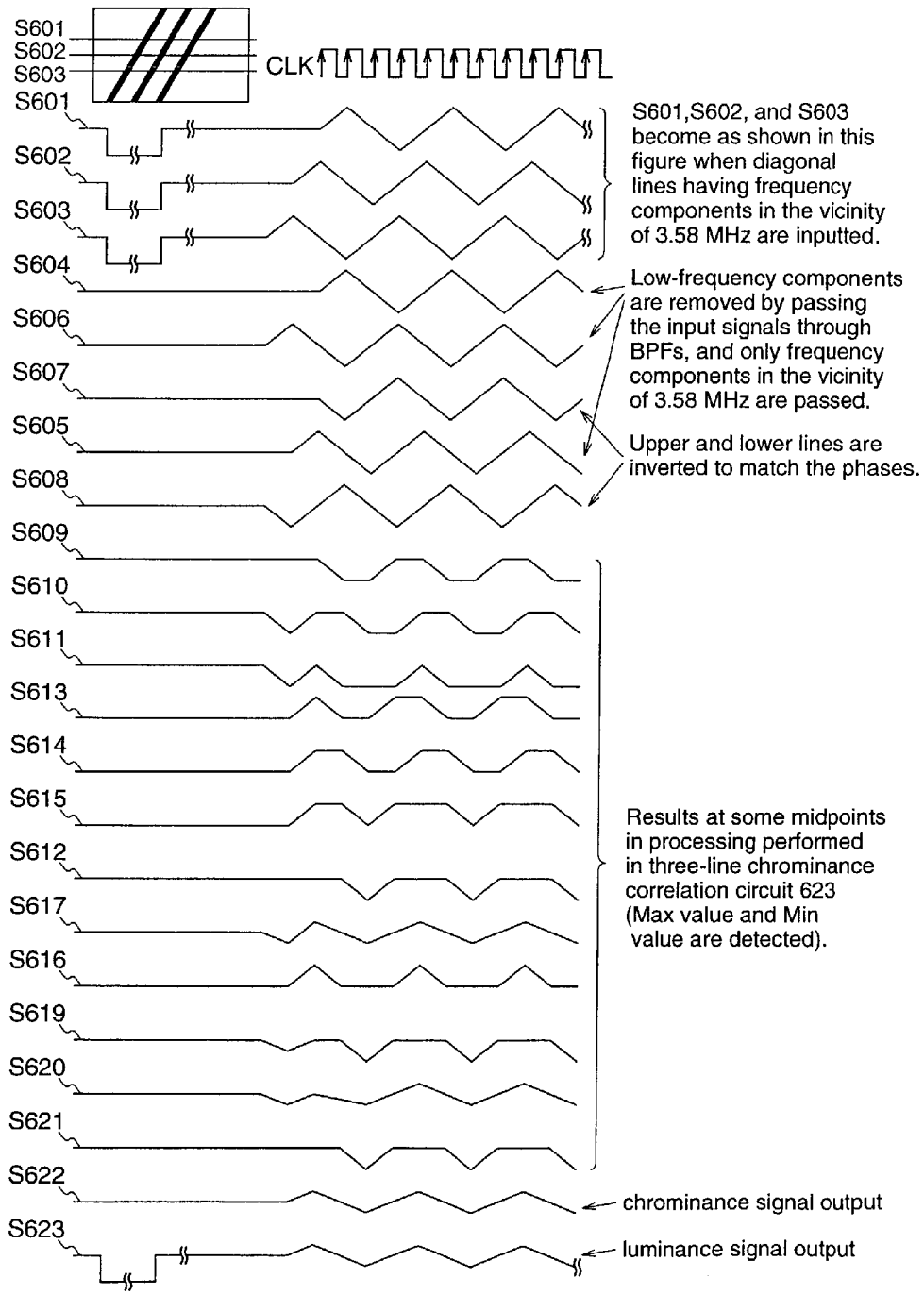
FIG. 14 is a timing chart of video signals in the conventional luminance signal/chrominance signal separation device.

FIGS. 12(a)–12(c) are diagrams illustrating examples of frequency characteristics of band pass filters. More specifically, FIG. 12(a) shows the frequency characteristics of a broad-band pass filter with the frequency of 3.58 MHz in the center, and FIG. 12(b) shows the frequency characteristics of a narrow-band pass filter with the frequency of 3.58 MHz in the center. As an example of a transfer function of the band pass filter shown in FIG. 12(a), $-(1-z^{-2})^2/4$ is employed. As an example of a transfer function of the band pass filter shown in FIG. 12(b), $(1+z^{-4})^2/4$ is employed. By passing a signal through these two kinds of filters, a filter of a narrow bandwidth with 3.58 MHz in the center can be constituted as shown in FIG. 12(c).

Hereinafter, the operation of the luminance signal/chrominance signal separation device so constructed will be described.

An inputted composite video signal S101 is delayed by one line in the line memory 101 to obtain a composite video signal S102, and the composite video signal S102 is delayed by another one line in the line memory to obtain a composite video signal S103. These three lines of composite video signals S101, S102, and S103 are subjected to band restriction by the band pass filters 103, 104, and 105 having a pass frequency band 1 with 3.58 MHz in the center as shown in FIG. 12(a), thereby obtaining video signals S104, S105, and S106. Since the phase of the chrominance signal is inverted at 180° for every line, assuming that the center line (reference line to be a reference when performing chrominance separation) of the band-restricted video signals is S105, the signal in the center line is added to each of the band-restricted video signals S104 and S106 in the lines one-line before and after the center line by the adders 130 and 131, thereby obtaining upper and lower luminance component signals S130 and S131, respectively. The luminance component signals S130 and S131 are delayed, each by one unit time, in the delay circuits 132 and 133 so that arithmetic operation in the diagonal direction can be carried out. Then, the delayed luminance component signal S133 is subtracted from the luminance component signal S130 by the subtracter 134 to obtain a difference signal S134, thereby detecting the amount of diagonal component, and a absolute value difference signal S136 is obtained by the absolute value circuit 136. Since the absolute value difference signal S136 is small when there are many luminance signal components in the diagonal direction, the signal S136 is compared with the judgement level S141 by the comparison circuit 138 to detect that the luminance components exist in the diagonal direction, thereby obtaining a diagonal luminance component judgement signal S138. Likewise, the delayed luminance component signal S132 is subtracted from the luminance component signal S131 by the subtracter 135 to obtain a difference signal S135, and an absolute value difference signal S137 is obtained by the absolute value circuit 137. Since the absolute value difference signal S137 is small when there are many luminance signal components in the diagonal direction, the signal S137 is compared with the judgement level S141 by the comparison circuit 139 to detect that the luminance components exist in the diagonal direction, thereby obtaining a diagonal luminance component judgement signal S139. The logic circuit 140 is an OR circuit, and the OR circuit 140 outputs a switching signal S140 when at least one of the diagonal component judgement signals S138 and S139 indicates that there are diagonal components.

The band-restricted video signals S104, S105, and S106 are subjected to band restriction by the band pass filters 124, 125, and 126 having a pass frequency band 2 as shown in FIG. 12(b), that is, each filter having 3.58 MHz as a center frequency, and a pass frequency range narrower than the pass frequency band 1 in the previous stage, thereby obtaining band-restricted video signals S124, S125, and S126. Therefore, by passing the signals through the band pass filters 103, 104, and 105 of the pass frequency band 1 and the band pass filters 124, 125, and 126 of the pass frequency band 2, a filter of a narrow bandwidth with 3.58 MHz in the center can be constituted. That is, by passing the signals through these two kinds of band pass filters, the low-frequency components are removed. Since the bandwidth obtained by combining the bandwidths of these two kinds of band pass filters is narrow, a signal of a frequency a little apart from the vicinity of 3.58 MHz is attenuated more than in the conventional device. Therefore, when it is detected that luminance components exist in the diagonal direction, the narrow-band-restricted video signals S124, S125, and S126 are input to the three-line chrominance separation circuit 123 as input signals S127, S128, and S129, respectively, according to the switching signal S140. On the other hand, when it is detected that no luminance components exist in the diagonal direction, the band-restricted video signals S104, S105, and S106 are input to the three-line chrominance separation circuit 123 as input signals S127, S128, and S129, respectively, according to the switching signal S140. In the three-line chrominance separation circuit 123, the phases of the signals in the lines before and after the center line are inverted by the inversion circuits 106 and 107 to match the phases of the chrominance signals among the three lines and, thereafter, a chrominance signal S122 is obtained by utilizing the correlation in the vertical direction among the three lines, with the minimum value circuits 108, 109, 110, 115, 118, 119, 120, the maximum value circuits 111, 112, 113, 114, 121, the adder 116, and the one-half circuit 117. This chrominance signal S122 has an output amplitude smaller than that obtained in the conventional device. Then, the subtracter 122 subtracts the chrominance signal S122 from the composite video signal S102 to obtain a luminance signal S123.

Figure 2:
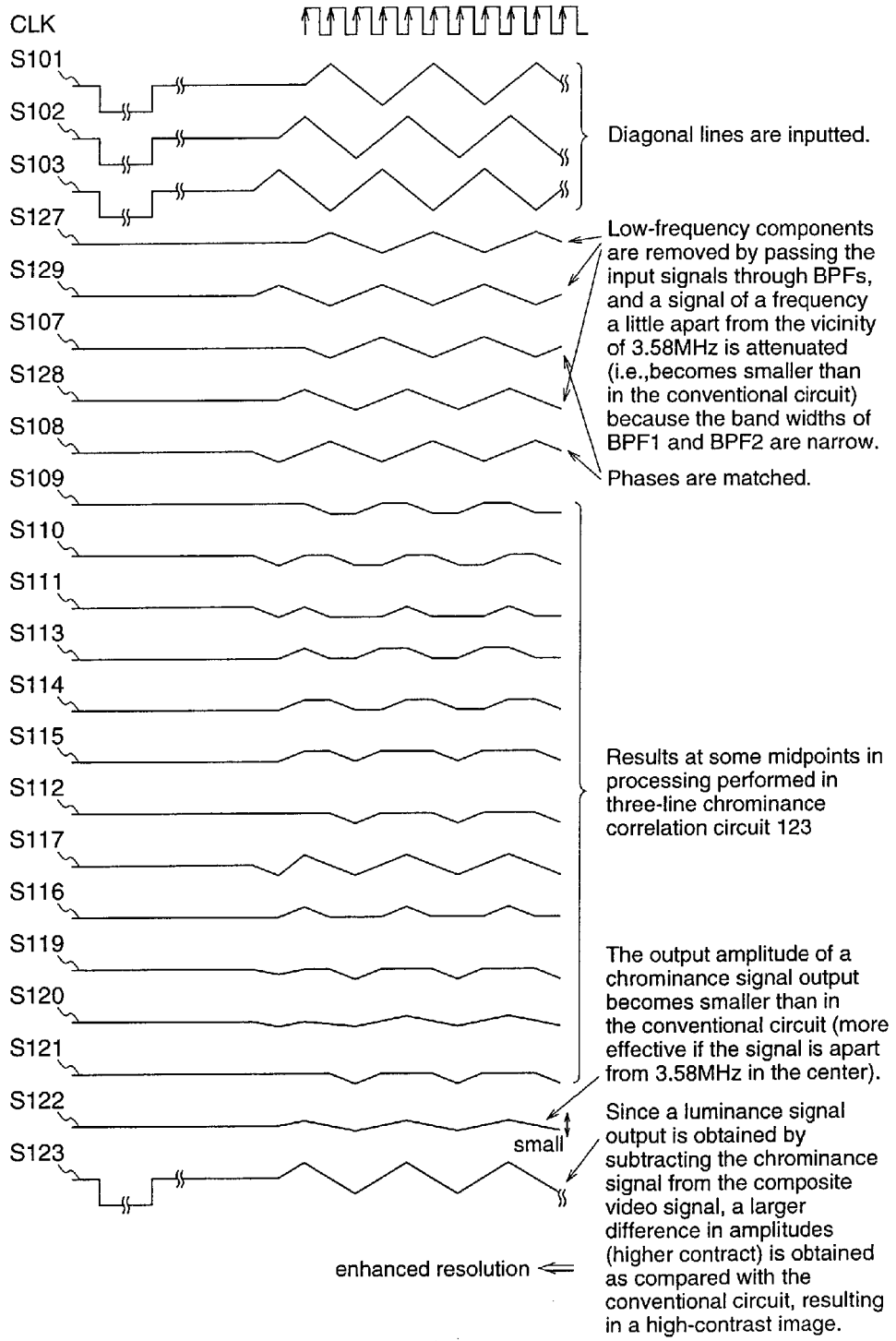
FIG. 2 is a timing chart of video signals in the luminance signal/chrominance signal separation device according to the first embodiment of the invention.

FIG. 2 shows examples of signals in a case where an image of diagonal lines is inputted as a composite signal.

In FIG. 2, composite video signals S101, S102, and S103 are in their states where diagonal lines are inputted. Further, composite video signals S127, S128, and S129 shown in FIG. 2 are obtained by passing the signals S101, S102, and S103 through the two kinds of band pass filters 103, 104, 105 and 124, 125, 126 to remove the low-frequency components thereof. That is, since the bandwidth obtained by integrating the bands of the two kinds of band pass filters is narrower than the bandwidth in the case where only the band pass filters 103, 104, and 105 are used, a signal whose frequency is a little apart from the vicinity of 3.58 MHz is attenuated more than in the conventional device. Further, signals S107 and S108 shown in FIG. 2 are inverted by the inversion circuits 106 and 107 to match their phases with the output signal S128 of the switch 128. Further, signals S109~S121 shown in FIG. 2 indicate results obtained in the middle of processing in the three-line chrominance correlation circuit 123. A signal S122 is a chrominance signal output, whose output amplitude is smaller than that obtained in the conventional device, and the amplitude becomes smaller with distance from the center of 3.58 MHz. A signal S123 is a luminance signal output, which is obtained by subtracting the chrominance signal from the composite video signal. Since the output amplitude of the chrominance signal becomes smaller than that in the conventional device, an amplitude difference (contrast) is obtained, resulting in a high-contrast image.

As described above, according to the first embodiment of the invention, the luminance diagonal correlation detection circuit 141 detects correlation of luminance signal components in the diagonal direction from the band-restricted video signals among the three lines of input composite video signals. When luminance signal components in the diagonal direction, such as diagonal stripes, are input, the characteristics of the band pass filters are switched to narrow the bands of the signals S127, S128, and S129 to be input to the three-line chrominance separation circuit 123, whereby cross color in the output chrominance signal is reduced, and resolution of the output luminance signal in the diagonal direction is improved.

While in this first embodiment the band pass filters 124, 125, and 126 are described as filters having band pass characteristics narrower than those of the band pass filters 103, 104, and 105, these band pass filters 124, 125, and 125 may have the same characteristics as those of the band pass filters 103, 104, and 105, and the filter effect may be changed by changing the number of filter stages.

Further, the degree of detectable correlation in the diagonal direction may be changed by adaptively changing the judgement level S141 in the luminance diagonal correlation detection circuit 141.

[Embodiment 2]

A second embodiment of the present invention corresponds to claims 8~11 and 19. In this second embodiment, the accuracy of detecting correlation in the diagonal direction is increased by detecting vertical correlation of the luminance signal in addition to the diagonal components of the luminance signal, and the bands of signals to be input to the three-line chrominance separation circuit 123 are broadened only when the luminance components have no correlation in the vertical direction although they have correlation in the diagonal direction, thereby suppressing malfunction in detecting correlation in the diagonal direction.

Hereinafter, the second embodiment of the invention will be described with reference to the drawings.

Figure 3:
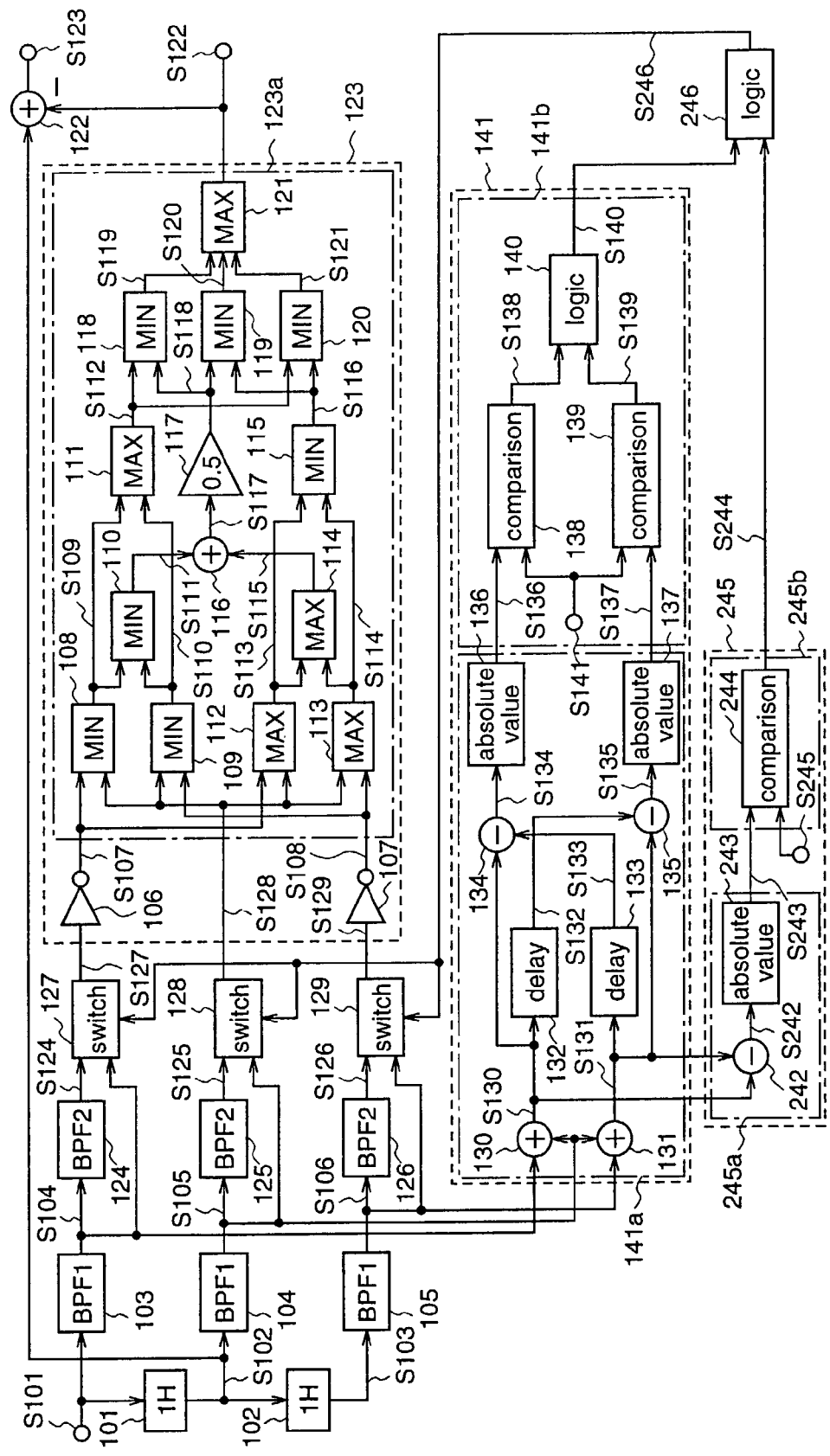
FIG. 3 is a block diagram illustrating the construction of a luminance signal/chrominance signal separation device according to a second embodiment of the invention.

FIG. 3 is a block diagram illustrating a luminance signal/chrominance signal separation device according to the second embodiment. The luminance signal/chrominance signal separation device shown in FIG. 3 is provided with components described below, in addition to the components described for the first embodiment. That is, in FIG. 3, reference numeral 242 denotes a subtracter (third subtraction unit), numeral 243 denotes an absolute value circuit (third absolute value unit), numeral 244 denotes a comparison circuit (third comparison unit), and numeral 245 denotes a luminance signal vertical component detection circuit (vertical luminance correlation detection unit) comprising the above-mentioned components 242~244, which detects, from an inputted composite video signal, luminance signal components in the vertical direction between lines before and after a reference line to be a reference when the three-line chrominance separation circuit 123 performs chrominance separation. The subtracter 242 subtracts an output signal S131 of the adder 131 from an output signal S130 of the adder 130. The absolute value circuit 243 outputs an absolute value of an output signal S242 of the subtracter 242. The subtracter 242 and the absolute value circuit 243 constitute a vertical difference detector 245a for detecting a vertical difference that is the size of a difference between signal components which deviate from each other in the vertical direction, in the composite video signals in the lines before and after the reference line. The comparator 244 compares an output signal S243 of the absolute value circuit 243 with a judgement level (second judgement level), and the comparator 244 constitutes a vertical correlation judgement unit 245b for judging the presence/absence of luminance vertical correlation by comparing the vertical difference detected by the vertical difference detection unit 245a with the second judgement level. Further, a logic circuit (second logic unit) 246 performs a predetermined logical operation on an output signal S244 of the comparator 244 and on an output signal S140 of the logic circuit 140 in the luminance diagonal correlation detection circuit 141, and controls the switches 127~129 with an output signal S246.

Hereinafter, the operation of the luminance signal/chrominance signal separation device so constituted will be described.

The components which perform the same operations as described for the first embodiment are given the same reference numerals, and explanations of their operations will be omitted. The luminance signal components S130 and S131 positioned above and beneath the center line are input to the subtracter 242 of the luminance vertical correlation detection circuit 245, and subtraction is carried out to obtain a difference signal S242 in the vertical direction, and thereafter, an absolute value component S243 in the vertical direction is obtained by the absolute value circuit 243. Since the value of the absolute value difference signal S243 is small when there are many luminance signal components in the vertical direction, the comparator 244 compares the signal S243 with the judgement level (second judgement level) S245 of the luminance components in the vertical direction to detect that luminance components exist in the vertical direction, thereby obtaining a vertical luminance component judgement signal S244. The logic circuit 246 is an AND circuit, one of two inputs of which is negative logic, and the AND circuit 246 outputs a switching signal S246 when it is judged, from the vertical luminance component judgement signal S244 and the diagonal component judgement signal S140, that the luminance signal components have no correlation in the vertical direction, and that there are diagonal luminance components. When this switching signal S246 indicates that the luminance components do not have correlation in the vertical direction but have correlation in the diagonal direction, the video signals S124, S125, and S126 which are restricted within a narrow band are input to the three-line chrominance separation circuit 123 as input signals S127, S128, and S129, by the switching circuits 127, 128, and 139. When the switching signal S246 indicates that there are no luminance components in the diagonal direction, the band-restricted video signals S104, S105, and S106 are input to the three-line chrominance separation circuit 123 as input signals S127, S128, and S129. Then, a chrominance signal S122 is obtained in the three-line chrominance separation circuit 123, and the chrominance signal S122 is subtracted from the composite video signal S102 to obtain a luminance signal S123.

Figure 4:
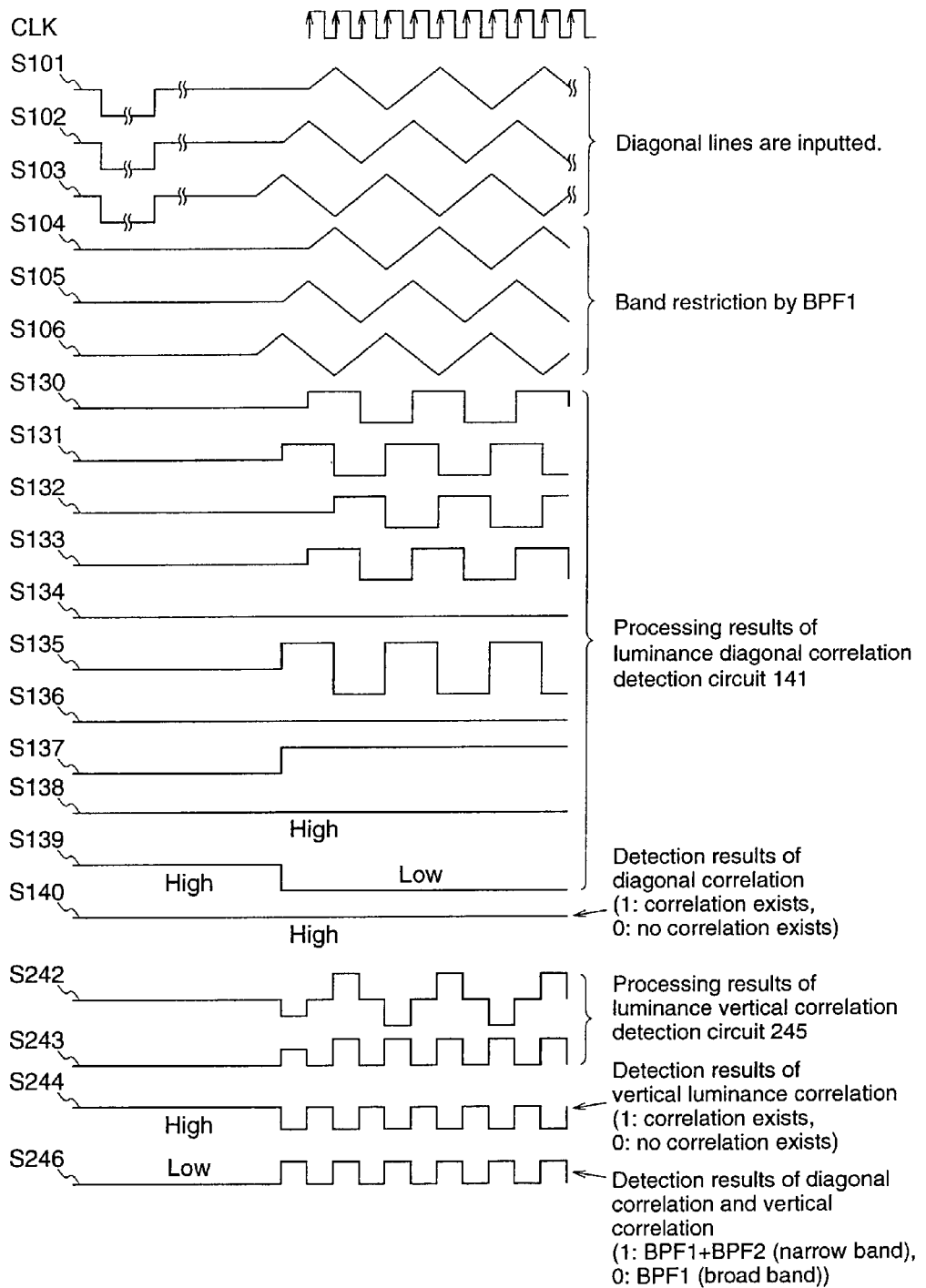
FIG. 4 is a timing chart of video signals in a case where diagonal lines are input to the luminance signal/chrominance signal separation device according to the second embodiment of the invention.

FIG. 4 is a diagram illustrating examples of signals in a case where an image of diagonal lines is inputted as a composite signal.

In FIG. 4, composite video signals S101, S102, and S103 are in their states where diagonal lines are inputted. Further, composite video signals S104, S105, and S106 shown in FIG. 4 are obtained by subjecting the signals S101, S102, and S103 to band restriction through the band pass filters 103, 104, and 105, respectively. Signals S130~S139 shown in FIG. 4 indicate results of processing performed in the diagonal correlation detection circuit 141. A signal S140 shown in FIG. 4 indicates a result of diagonal correlation detection, wherein "High" indicates that correlation exists, and "Low" indicates that no correlation exists. Signals S242 and S243 shown in FIG. 4 indicate results of detection performed in the luminance vertical correlation detection circuit 245. A signal S244 shown in FIG. 4 indicates a result of detection performed in the luminance vertical correlation detection circuit 245, wherein "High" indicates that correlation exists, and "Low" indicates that no correlation exists. As shown in FIG. 4, this detection result becomes "Low" in an area where the values of the composite video signals S101 and S103 are significantly different from each other, and it becomes "High" in an area where the values of these signals S101 and S103 are not very much different from each other. A signal S246 shown in FIG. 4 is a control signal for the switching circuits 127, 128, and 129, which comprehensively reflects the diagonal correlation and the vertical correlation. In the control signal S246, "High" indicates a case where narrow-band pass characteristics are realized by the band pass filters 103, 104, 105, and the band pass filters 124, 125, 126, and "Low" indicates a case where broad-band pass characteristics are realized by only the band pass filters 103, 104, and 105, the bandwidth of which is broader than that in the case where the band pass filters 124, 125, and 126 are added. According to the control signal S246, when correlation exists in the diagonal direction and no correlation exists in the vertical direction, the input signals to the three-line chrominance separation circuit 123 are subjected to band restriction by the narrow-band pass characteristics which are obtained by integrating the characteristics of the two kinds of band pass filters 103, 104, 105, and 124, 125, 126. On the other hand, when correlations exist in both of the diagonal direction and the vertical direction, the input signals to the three-line chrominance separation circuit 123 are band-restricted by the broad-band pass characteristics which are realized by only the band pass filters 103, 104, and 105.

Figure 5:
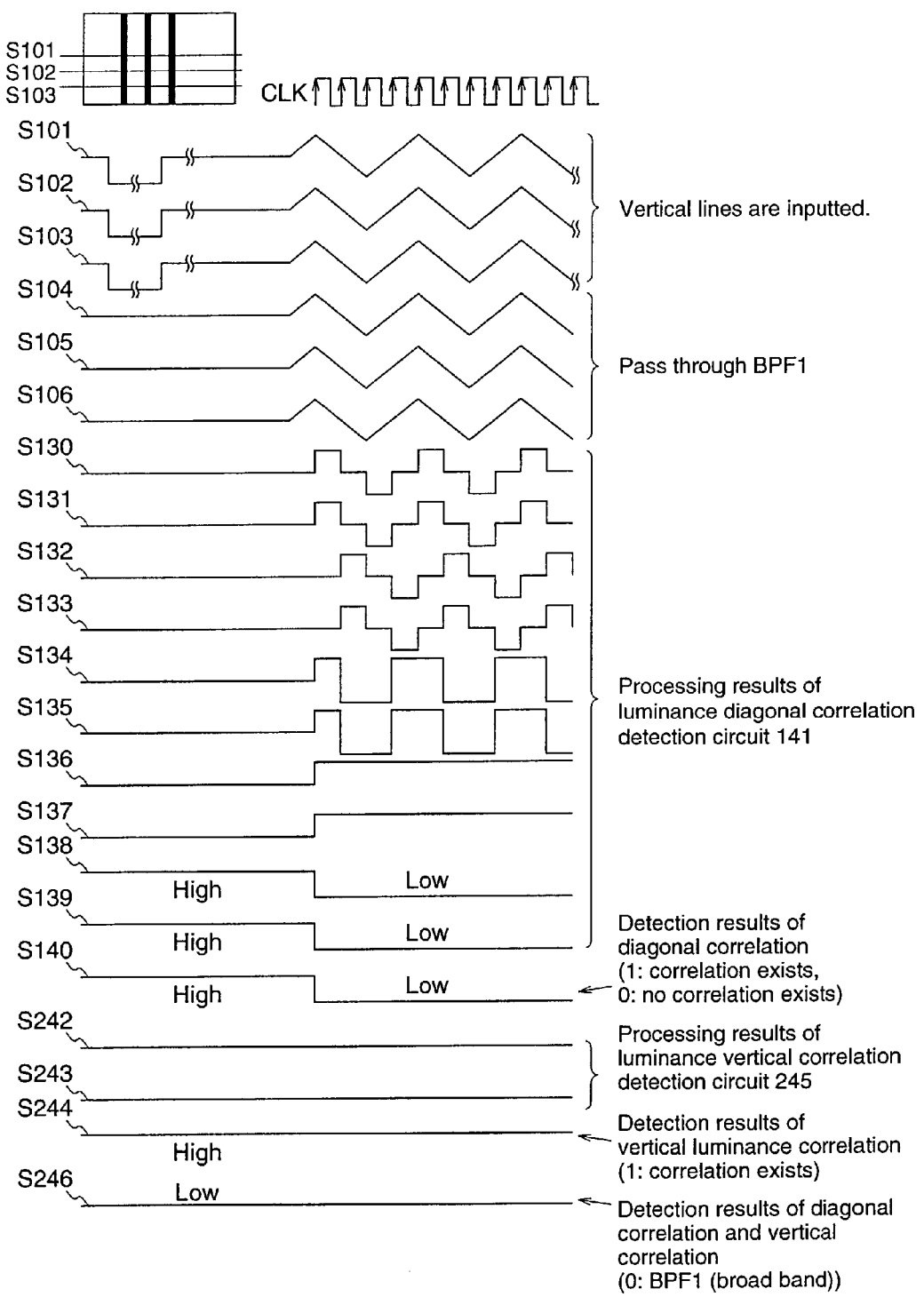
FIG. 5 is a timing chart of video signals in a case where vertical lines are input to the luminance signal/chrominance signal separation device according to the second embodiment of the invention.

FIG. 5 is a diagram illustrating examples of signals in a case where an image of vertical lines is inputted as a composite video signal.

In FIG. 5, composite video signals S101, S102, and S103 are in their states where vertical lines are inputted. Further, composite video signals S104, S105, and S106 shown in FIG. 5 are obtained by subjecting the signals S101, S102, and S103 to band restriction through the band pass filters 103, 104, and 105, respectively. Signals S130~S139 shown in FIG. 5 indicate results of processing performed in the diagonal correlation detection circuit 141. A signal S140 shown in FIG. 5 indicates a result of diagonal correlation detection, wherein "High" indicates that correlation exists, and "Low" indicates that no correlation exists. In the case of FIG. 5, since the vertical lines are input, the signal S140 indicates that no correlation exists. Signals S242 and S243 shown in FIG. 5 indicate results of processing performed in the luminance vertical correlation detection circuit 245. A signal S244 shown in FIG. 5 indicates a result of detection by the luminance vertical correlation detection circuit 245. In the case of FIG. 5, the signal S244 indicates that correlation exists. A signal S246 shown in FIG. 5 indicates a control signal for the switching circuits 127, 128, and 129, which comprehensively reflects the diagonal correlation and the vertical correlation. According to the control signal S246, the input signals to the three-line chrominance separation circuit 123 are band-restricted by the broad-band pass characteristics which are realized by only the band pass filters 103, 104, and 106.

Figure 6:
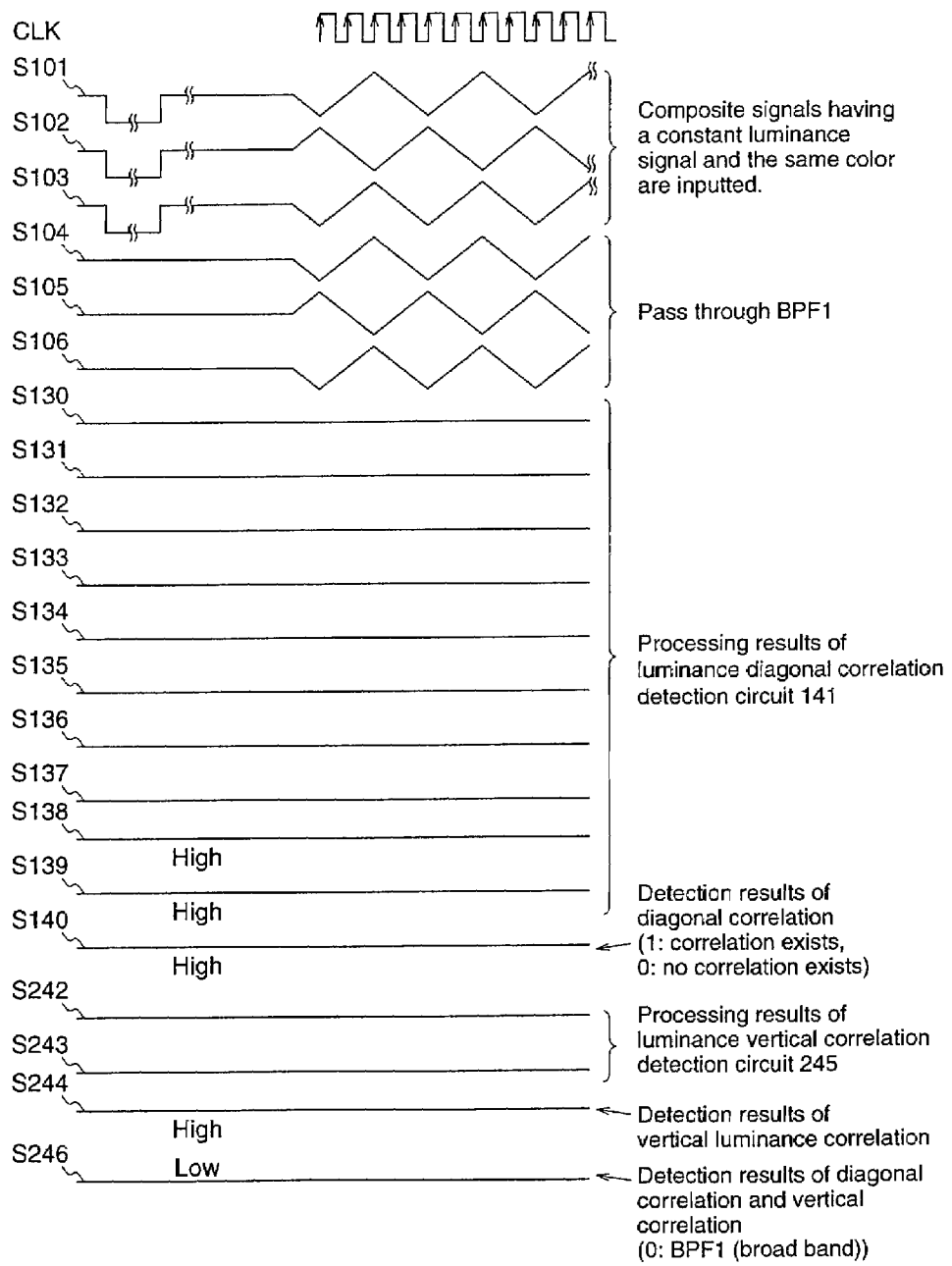
FIG. 6 is a timing chart of video signals in a case where images of the same color are input to the luminance signal/chrominance signal separation device according to the second embodiment of the invention.

FIG. 6 is a diagram illustrating examples of signals in a case where an image of a uniform color is inputted as a composite signal.

In FIG. 6, composite video signals S101, S102, and S103 are in their states where an image having a constant luminance signal and a uniform color is inputted. Further, composite video signals S104, S105, and S106 shown in FIG. 6 are obtained by subjecting the signals S101, S102, and S103 to band restriction through the band pass filters 103, 104, and 105, respectively. Signals S130~S139 shown in FIG. 6 indicate results of processing performed in the diagonal correlation detection circuit 141. A signal S140 shown in FIG. 6 indicates a result of detection by the diagonal correlation detection circuit 141, wherein "High" indicates that correlation exists, and "Low" indicates no correlation exists. In the case of FIG. 6, since an image of a uniform color is inputted, the signal S140 indicates that no correlation exists. Signals S242 and S243 shown in FIG. 6 indicate results of processing performed in the luminance vertical correlation detection circuit 245. A signal S244 shown in FIG. 6 indicates a result of detection by the luminance vertical correlation detection circuit 245. In the case of FIG. 6, the signal S244 indicates that correlation exists. A signal S246 shown in FIG. 6 is a control signal for the switching circuits 127, 128, and 129, which comprehensively reflects the diagonal correlation and the vertical correlation. According to the control signal S246, the input signals to the three-line chrominance separation circuit 123 are band-restricted by the broad-band pass characteristics which are realized by only the band pass filters 103, 104, and 105.

According to the second embodiment of the invention, correlations of luminance signal components in the diagonal direction and the vertical direction are detected from the band-restricted video signals among the three lines of inputted composite video signals, by the luminance diagonal correlation detection circuit 141 and the luminance vertical correlation detection circuit 245, respectively. When the luminance components do not have correlation in the vertical direction but have correlation in the diagonal direction, the characteristics of the band pass filters are switched so as to narrow the bands of the signals S127, S128, and S129 to be input to the three-line chrominance separation circuit 123. Therefore, when the bands of signals to be input are narrowed in the case where luminance signal components in the diagonal direction only, such as diagonal stripes, are input to the three-line chrominance separation circuit 123, if even a small amount of luminance components can be detected in the vertical direction, the detection result is taken with priority to suppress restriction of the bands to be input to the chrominance separation circuit 123, whereby accuracy of operation for reducing cross color in the chrominance signal to be output can be increased and, further, improvement of resolution in the diagonal direction of the luminance signal to be output can be achieved more accurately.

Further, the sensitivity of detection of luminance correlation in the vertical direction can be changed by adaptively changing the judgement level S245 in the luminance vertical correlation detection circuit 245.

[Embodiment 3]

A third embodiment of the present invention corresponds to claims 12~15 and 20. In this third embodiment, vertical correlation of the chrominance signals is detected in addition to the diagonal components and vertical correlation of the luminance signals, whereby the accuracy of detecting correlation in the diagonal direction is further improved. Furthermore, the bands of signals to be inputted to the three-line chrominance separation circuit 123 are narrowed only when the luminance components have no correlation in the vertical direction although they have correlation in the diagonal direction, and the chrominance components also have no correlation in the vertical direction, thereby further suppressing malfunction in detecting correlation in the diagonal direction.

Hereinafter, the third embodiment of the invention will be described with reference to the drawings.

Figure 7:
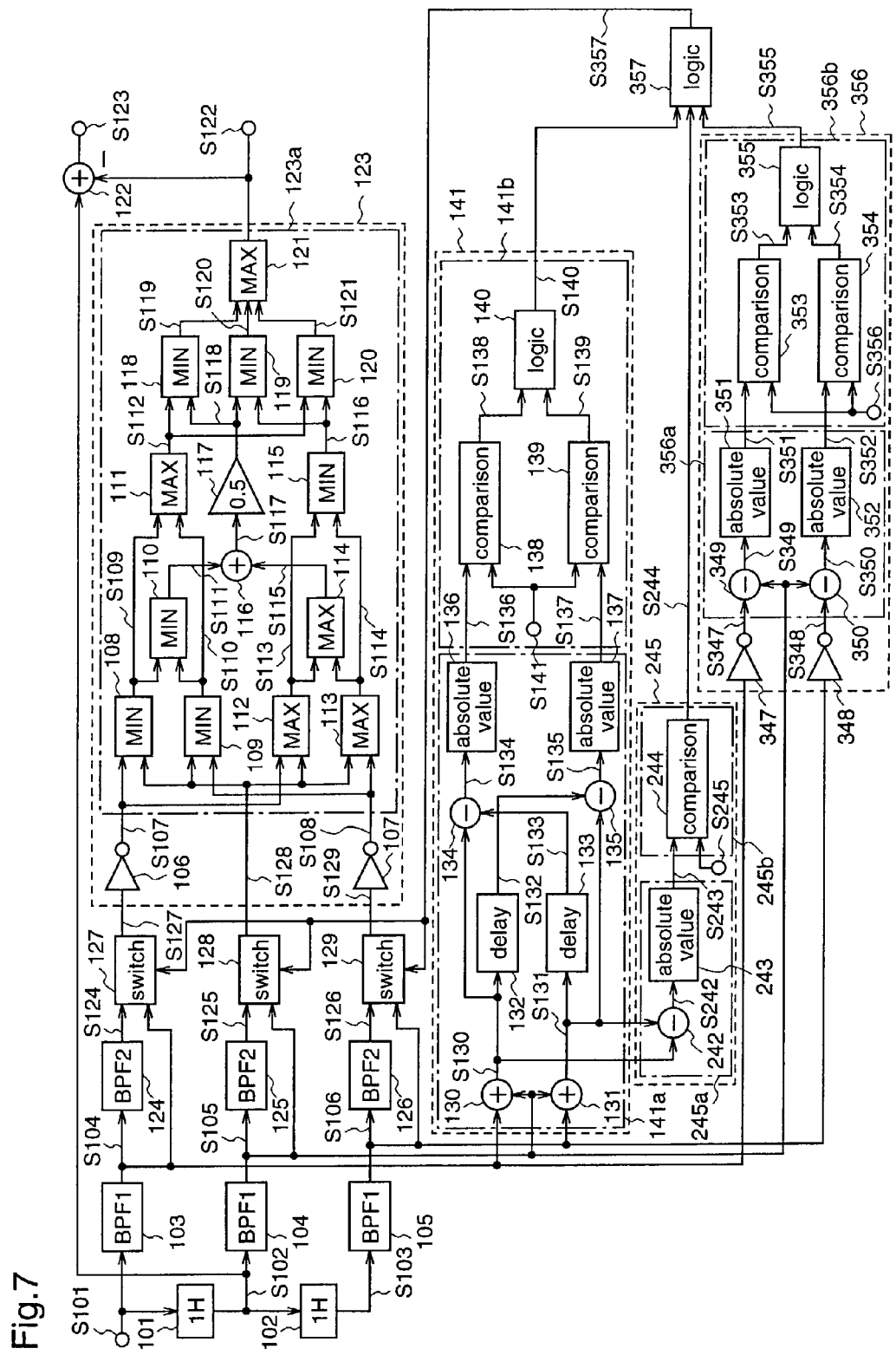
FIG. 7 is a block diagram illustrating the construction of a luminance signal/chrominance signal separation device according to a third embodiment of the invention.

FIG. 7 is a block diagram illustrating a luminance signal/chrominance signal separation device according to the third embodiment. The luminance signal/chrominance signal separation device shown in FIG. 7 is provided with components described below, in addition to the components described for the second embodiment. In FIG. 7, reference numerals 347 and 348 denote inversion circuits (third and fourth inversion units), numerals 349 and 350 denote subtracters (fourth and fifth differential units), numerals 351 and 352 denote absolute value circuits (fourth and fifth absolute value units), numerals 353 and 354 denotes comparison circuits (fourth and fifth comparison units), numeral 355 denotes a logic circuit (third logic unit), and numeral 356 denotes a vertical chrominance correlation detection circuit (vertical chrominance correlation detection unit) for detecting chrominance signal components in the vertical direction between the lines before and after the reference line. The inversion circuits 347 and 348 invert output signals of the band pass filters 103 and 105. The subtracter 349 subtracts an output signal S105 of the band pass filter 104 from an output signal S347 of the inversion circuit 347. The subtracter 350 subtracts the output signal S105 of the band pass filter 104 from an output signal S348 of the inversion circuit 348. The absolute value circuits 351 and 352 calculate absolute values of output signals S349 and S350 of the subtracters 351 and 352, respectively. The inversion circuits 347 and 348 and the absolute value circuits 351 and 352 constitute an inter-adjacent-line vertical difference detector 356a for detecting an inter-adjacent-line vertical difference that is the size of a difference between signal components which deviate from each other in the vertical direction, in the composite video signals in the reference line and in the lines before and after the reference line. Further, the comparator 353 compares an output signal S351 of the absolute value circuit 351 with a judgement level (third judgement level) S356. The comparator 354 compares an output signal S352 of the absolute value circuit 352 with the judgement level S356. The logic circuit 355 performs logical operation on an output signal S353 of the comparator 353 and on an output signal S354 of the comparator 354. The comparators 353 and 354 and the logic circuit 355 constitute an inter-adjacent-line vertical correlation judgement unit 356b which judges the presence/absence of vertical chrominance correlation by comparing the inter-adjacent-line vertical difference detected by the inter-adjacent-line vertical difference detector 356a with the third judgement level. Further, the logic circuit (fourth logic unit) 357 performs logical operation on an output signal S140 of the logic circuit 140, an output signal S244 of the comparator 244, and an output signal S355 of the logic circuit 355.

Hereinafter, the operation of the luminance signal/chrominance signal separation device so constructed will be described.

The components of the device which operate in the same manners as described for the first and second embodiments are assigned with the same reference numerals, and the operations thereof will not be described repeatedly.

Among the band-restricted video signals S104, S105, and S106, the signals in the upper and lower lines (S104 and S106) with respect to the reference line (S105) are inverted by the inversion circuits 347 and 348 to obtain video signals S347 and S348, and the reference-line video signal S105 is subtracted from each of the inverted video signals S347 and S348 by the subtracters 349 and 350 to obtain difference signals S349 and S350 of the chrominance components in the vertical direction, respectively. Thereafter, absolute value difference signals S351 and S352 of the chrominance components in the vertical direction are obtained by the absolute value circuits 351 and 352, respectively. Since the absolute value difference signals S351 and S352 are small when there are many chrominance signal components in the vertical direction, these signals S351 and S352 are compared with the judgement level S356 for chrominance components in the vertical direction by the comparison circuits 353 and 354, respectively, to detect that chrominance components exist in the vertical direction, thereby obtaining vertical chrominance component judgement signals S353 and S354. The logic circuit 355 is an OR circuit, and outputs a switching signal S355 when at least one of the diagonal component judgement signals S353 and S354 judges that there are chrominance components in the vertical direction. The logic circuit 357 is an AND circuit, one of two inputs of which is negative logic, and this AND circuit 357 outputs a switching signal S357 when it is judged that there is no correlation in the luminance signal components nor in the chrominance signal components in the vertical direction, and that there are diagonal luminance components, according to the diagonal component judgement signal S140, the vertical luminance component judgement signal S244, and the vertical chrominance component judgement signal S355. When the switching signal S357 indicates that the chrominance signal components have no correlation in the vertical direction, and that the luminance components do not have correlation in the vertical direction but have correlation in the diagonal direction, the switching circuits 127, 128, and 129 input the band-restricted video signals S124, S125, and S126 to the three-line chrominance separation circuit 123 as input signals S127, S128, and S129, respectively. When the switching signal S357 indicates that there are no luminance components in the diagonal direction, the switching circuits 127, 128, and 129 input the band-restricted video signals S104, S105, and S106 to the three-line chrominance separation circuit 123 as input signals S127, S128, and S129, respectively. Then, a chrominance signal S122 is obtained by the three-line chrominance separation circuit 123, and the chrominance signal S122 is subtracted from the composite video signal S102 by the subtracter 122 to obtain a luminance signal S123. When generating the switching signal S357, the judgement level in the luminance vertical correlation detection circuit 245 may be changed to enlarge the composite video signals relatively in the horizontal direction, whereby the judgement range of the diagonal components of the luminance signal can be extended.

Figure 8:
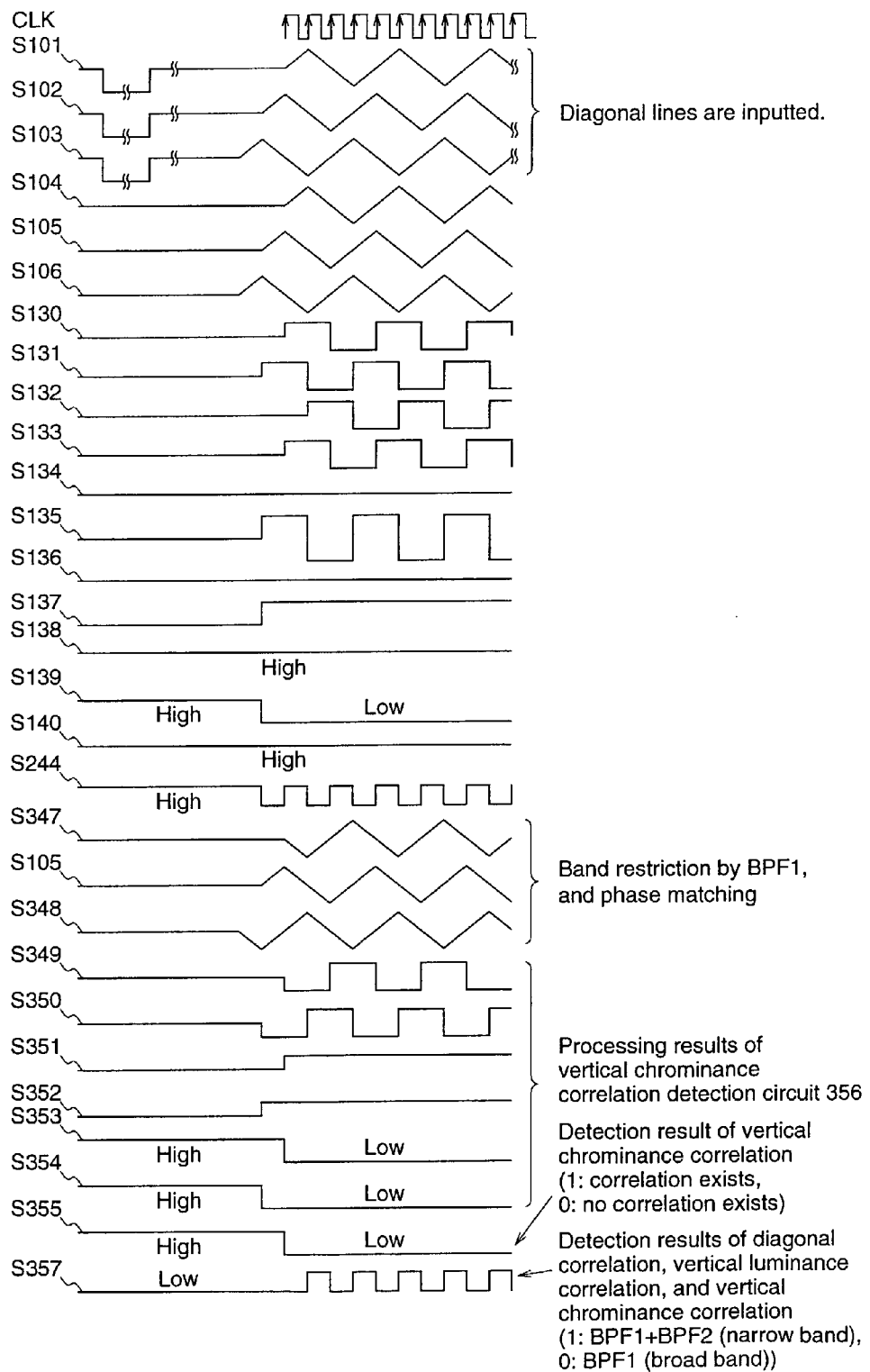
FIG. 8 is a timing chart of video signals in a case where diagonal lines are input to the luminance signal/chrominance signal separation device according to the third embodiment of the invention.

FIG. 8 is a diagram illustrating examples of signals in a case where an image of diagonal lines is inputted as a composite signal.

In FIG. 8, composite video signals S101, S102, and S103 are in their states where diagonal lines are inputted. Further, a signal S244 shown in FIG. 8 indicates a result of detection by the luminance vertical correlation detection circuit 245, wherein "High" indicates that correlation exists, and "Low" indicates that no correlation exists. As shown in FIG. 8, this detection result is "Low" in an area where the values of the composite video signals S101 and S103 significantly differ from each other, and "High" in an area where the values of the signals S101 and S103 do not differ very much. Further, composite video signals S347, S105, and S348 shown in FIG. 8 are obtained by subjecting the signals S101, S102, and S103 to band restriction and phase matching through the band pass filters 103, 104, and 105, and the inversion circuits 347 and 348, respectively. Signals S130~S139 shown in FIG. 8 indicate results of processing performed in the diagonal correlation detection circuit 141. A signal S140 shown in FIG. 8 indicates a result of diagonal correlation detection, wherein "High" indicates that correlation exists, and "Low" indicates that no correlation exists.

Further, signals S349~S354 shown in FIG. 8 indicate results of processing performed the vertical chrominance correlation detection circuit 356. A signal S355 shown in FIG. 8 indicates a result of detection by the vertical chrominance correlation detection circuit 356, wherein "High" indicates that correlation exists, and "Low" indicates that no correlation exists. As shown in FIG. 8, this detection result becomes "High" in the sync signal period and "Low" in the video signal period, because the phases of the composite signals S101 and S103 deviate from each other in the video signal period.

Furthermore, a signal S357 shown in FIG. 8 is a control signal for the switching circuits 127, 128, and 129, which comprehensively reflects the diagonal correlation, the vertical luminance correlation, and the vertical chrominance correlation. When the control signal S357 is "High", narrow-band pass characteristics are realized by the band pass filters 103, 104, 105, and the band pass filters 124, 125, 126. When the control signal S357 is "Low", broad-band pass characteristics are realized by only the band pass filters 103, 104, and 105, the bandwidth of which is broader than that in the case where the band pass filters 124, 125, and 126 are added. According to the control signal S357, when there is correlation in the diagonal direction and there is no luminance correlation nor chrominance correlation in the vertical direction, the input signals to the three-line chrominance separation circuit 123 are subjected to band restriction by the narrow-band pass characteristics which are realized by the two kinds of band pass filters 103, 104, 105 and 124, 125, 126. When there is no correlation in the diagonal direction or there is luminance correlation in the vertical direction, or when there is chrominance correlation, the input signals to the three-line chrominance separation circuit 123 are subjected to band restriction by the broad-band pass characteristics which are realized by the band pass filters 103, 104, and 105.

Figure 9:
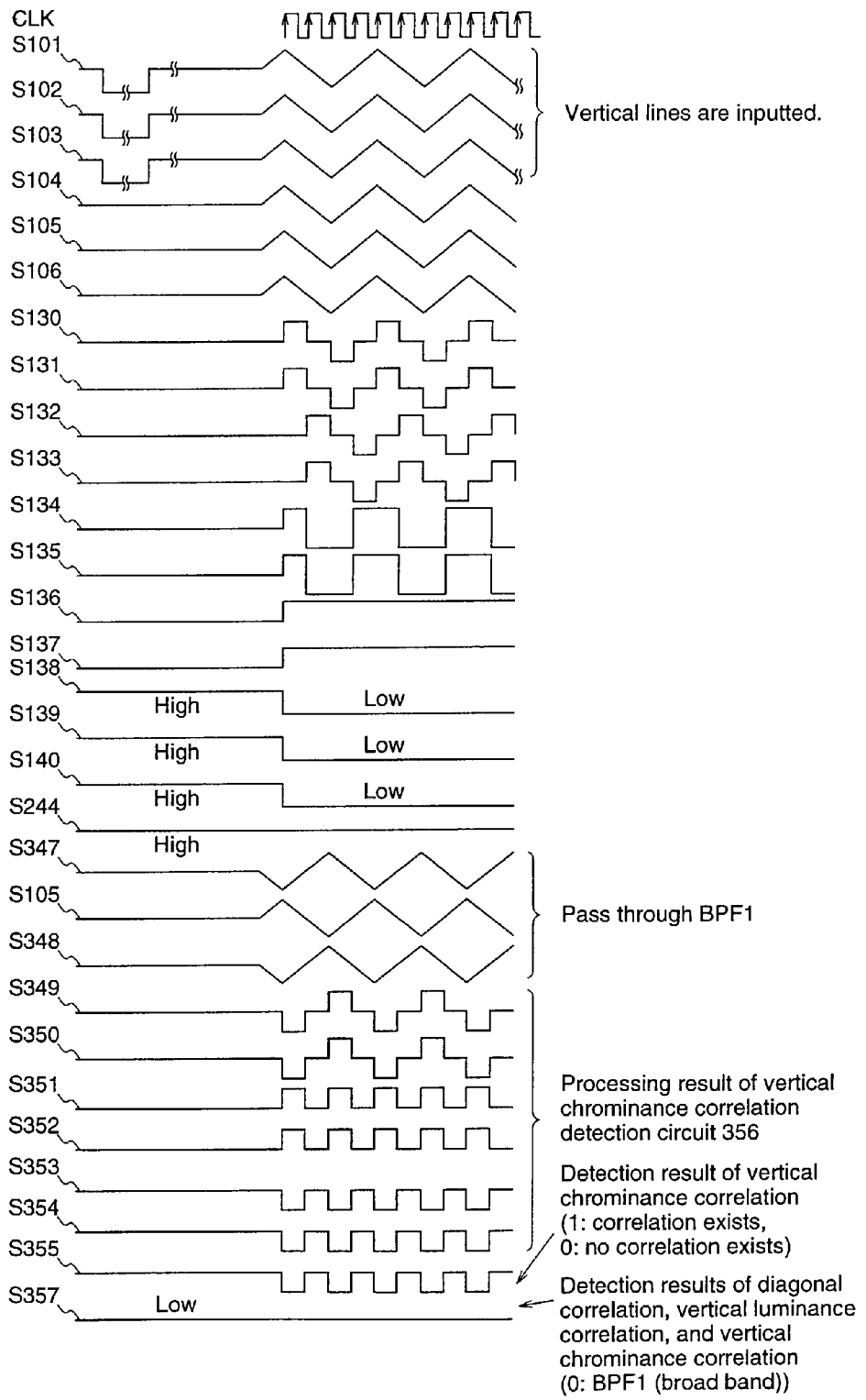
FIG. 9 is a timing chart of video signals in a case where vertical lines are input to the luminance signal/chrominance signal separation device according to the third embodiment of the invention.

FIG. 9 is a diagram illustrating examples of signals in a case where an image of vertical lines is inputted as composite signals.

In FIG. 9, S101, S102, and S103 indicate composite video signals in their states where vertical lines are inputted. Further, composite video signals S347, S105, and S348 shown in FIG. 9 are obtained by subjecting the signals S101, S102, and S103 to band restriction and phase matching through the band pass filters 103, 104, and 105 and the inversion circuits 347 and 348, respectively. Signals S130~S139 shown in FIG. 9 indicate results of processing performed in the diagonal correlation detection circuit 141. A signal S140 shown in FIG. 9 indicates a result of diagonal correlation detection, wherein "High" indicates that correlation exists, and "Low" indicates that no correlation exists. In the case of FIG. 9, since the vertical lines are inputted, the signal S140 indicates that no correlation exists. A signal S244 shown in FIG. 9 indicates a result of vertical luminance correlation detection. In the case of FIG. 9, the signal S244 indicates that correlation exists. Signals S349~S354 indicate results of processing performed in the vertical chrominance correlation detection circuit 356. Further, a signal S357 shown in FIG. 9 is a control signal for the switching circuits 127, 128, and 129, which comprehensively reflects the diagonal correlation, the vertical luminance correlation, and the vertical chrominance correlation. According to the control signal S357, the input signals to the three-line chrominance separation circuit 123 are subjected to band restriction by the broad-band pass characteristics which are realized by only the band pass filters 103, 104, and 105.

Figure 10:
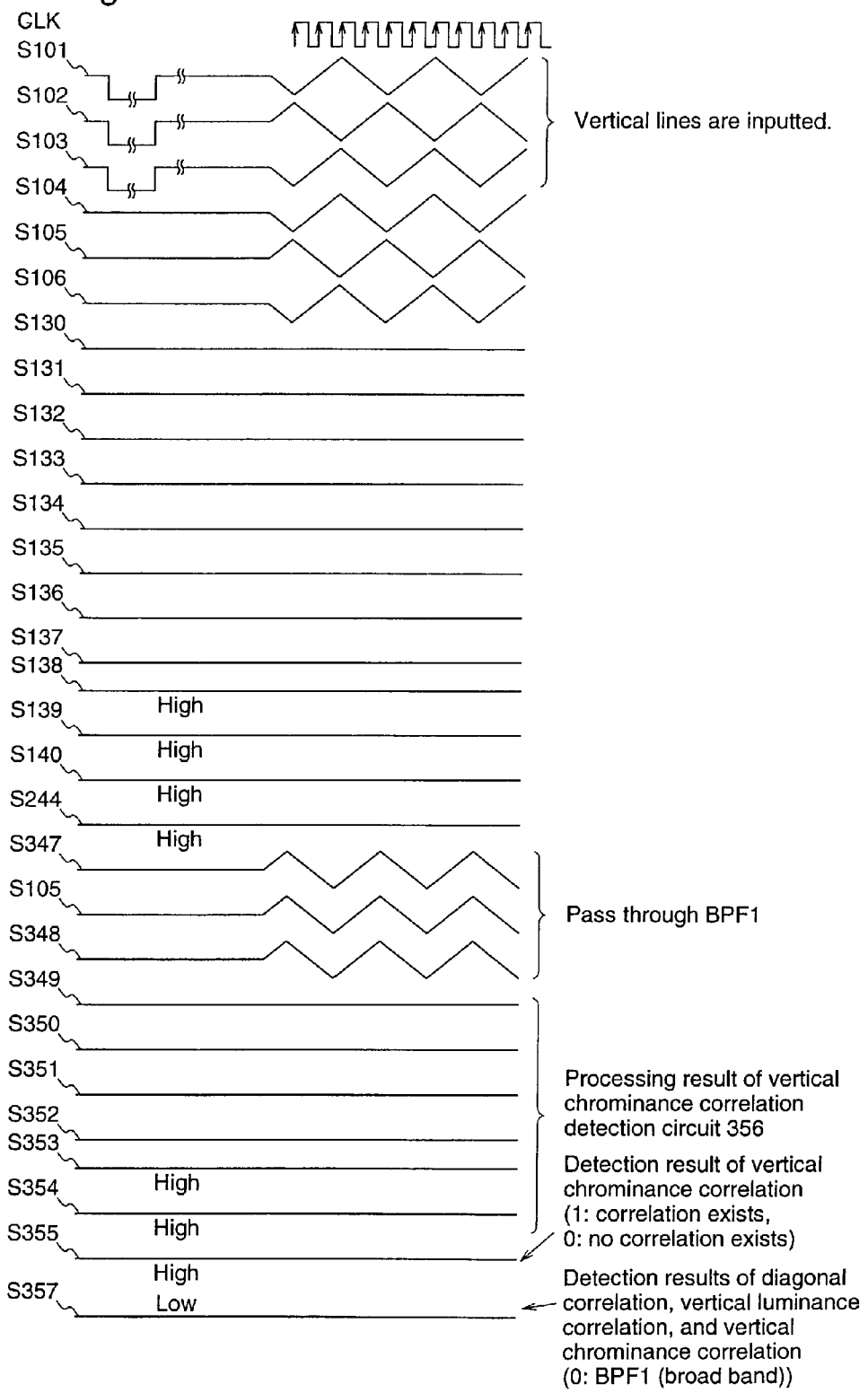
FIG. 10 is a timing chart of video signals in a case where images of the same color are input to the luminance signal/chrominance signal separation device according to the third embodiment of the invention.

FIG. 10 is a diagram illustrating examples of signals in the case where an image having a constant luminance signal and a uniform color is inputted as a composite signal.

In FIG. 10, composite video signals S101, S102, and S103 are in their states where an image having a constant luminance signal and a uniform color is inputted. Further, composite video signals S347, S105, and S348 shown in FIG. 10 are obtained by subjecting the signals S101, S102, and S103 to band restriction through the band pass filters 103, 104, and 105, respectively. Signals S130~S139 shown in FIG. 10 indicate results of processing performed in the diagonal correlation detection circuit 141. A signal S140 shown in FIG. 10 indicates a result of diagonal correlation detection, wherein "High" indicates that correlation exists, and "Low" indicates that no correlation exists. In the case of FIG. 10, since an image of a uniform color is inputted, the signal S140 indicates that no correlation exists. A signal S244 shown in FIG. 10 indicates a result of vertical luminance correlation detection. In the case of FIG. 10, the signal S244 indicates that correlation exists. Signals S349~S354 shown in FIG. 10 indicate results of processing performed in the vertical chrominance correlation detection circuit 356. A signal S355 indicates a result of detection by the vertical chrominance correlation detection circuit 356, wherein "High" indicates that correlation exists, and "Low" indicates that no correlation exists. A signal S357 shown in FIG. 10 is a control signal for the switching circuits 127, 128, and 129, which comprehensively reflects the diagonal correlation, the vertical luminance correlation, and the vertical chrominance correlation. According to this control signal S357, the input signals to the three-line chrominance separation circuit 123 are subjected to band restriction by the broad-band pass characteristics which are realized by only the band pass filters 103, 104, and 105.

According to the third embodiment of the invention, correlation of chrominance signal components in the vertical direction and correlations of luminance signal components in the vertical direction and in the diagonal direction are detected from the band-restricted video signals among the three lines of inputted composite video signals, by the luminance diagonal correlation detection circuit 141, the luminance vertical correlation detection circuit 245, and the vertical chrominance correlation detection circuit 356. When the chrominance components have no correlation in the vertical direction and the luminance components do not have correlation in the vertical direction but have correlation in the diagonal direction, the characteristics of the band pass filters are switched so as to narrow the bands of the signals S127, S128, and S129 to be input to the three-line chrominance separation circuit. Therefore, when the bands of signals to be input are narrowed in the case where luminance signal components in the diagonal direction only, such as diagonal stripes, are input to the three-line chrominance separation circuit 123, if even a small amount of luminance components and chrominance components can be detected in the vertical direction, this detection result is taken with priority to suppress restriction of the bands to be input to the chrominance separation circuit 123, whereby accuracy of operation for reducing cross color in the chrominance signal to be output can be improved, and improvement of resolution in the diagonal direction of the luminance signal to be output can be achieved more accurately.

The degree of detectable chrominance correlation in the vertical direction can be changed by adaptively changing the judgement level S356 in the vertical chrominance correlation detection circuit 356.

[Embodiment 4]

A fourth embodiment of the present invention corresponds to claims 16, 17, and 21. In this fourth embodiment, vertical correlation of chrominance signals is detected in addition to diagonal components and vertical correlation of luminance signals, whereby the accuracy of detecting correlation in the diagonal direction is further improved. The bands of signals to be output from the three-line chrominance separation circuit 123 are narrowed only when luminance components have no correlation in the vertical direction although they have correlation in the diagonal direction, and chrominance components have no correlation in the vertical direction, whereby malfunction in detecting correlation in the diagonal direction is further suppressed.

Hereinafter, the fourth embodiment of the present invention will be described with reference to the drawings.

Figure 11:
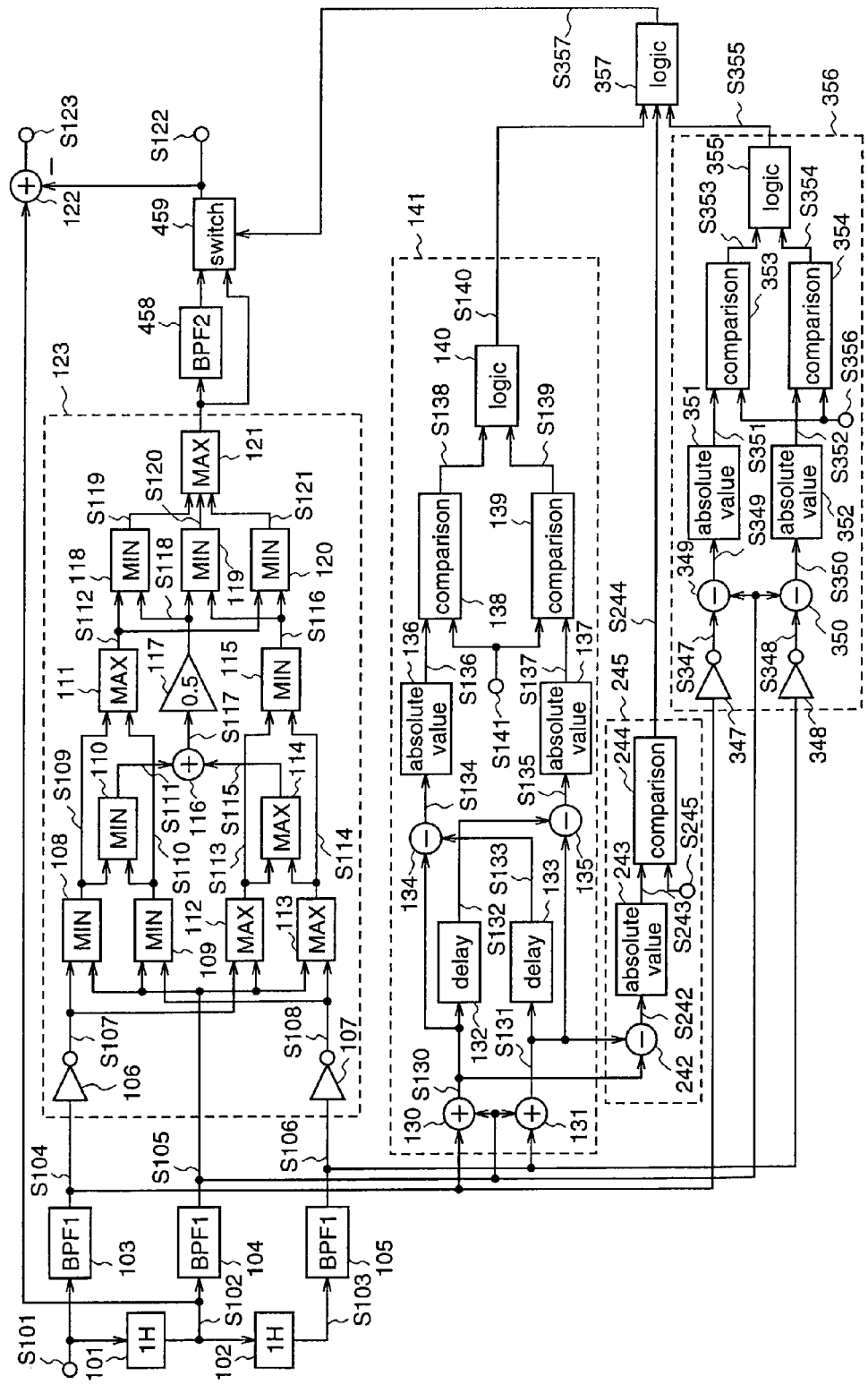
FIG. 11 is a block diagram illustrating the construction of a luminance signal/chrominance signal separation device according to a fourth embodiment of the invention.

FIG. 11 is a block diagram illustrating a luminance signal/chrominance signal separation device according to the fourth embodiment. In FIG. 11, reference numeral 458 denotes a third band pass filter, and numeral 459 denotes a switching circuit. The band pass filter 458 is supplied with the output signal from the three-line chrominance separation circuit 123, and the switching circuit 459 selects either the output signal of the three-line chrominance separation circuit 123 or the output signal of the band pass filter 458, according to the output signal S357 of the logic circuit 357. Although the components other than mentioned above are identical to those described for the third embodiment, the band pass filters 124~126 and the switching circuits 127~129, which are placed between the band pass filters 103~105 and the three-line chrominance separation circuit 123, are omitted.

Hereinafter, the operation of the luminance signal/chrominance signal separation device so constructed will be described.

The components of the device which operate in the same manners as described for the first, second, and third embodiments are assigned with the same reference numerals, and the operations thereof will not be described repeatedly.

When the switching signal S357 indicates that the chrominance signal components have no correlation in the vertical direction, and that the luminance components do not have correlation in the vertical direction but have correlation in the diagonal direction, the switching circuit 459 selects the signal which is obtained by subjecting the chrominance signal S122 outputted from the three-line chrominance separation circuit 123 to band restriction by the band pass filter 458. When it is detected that there are no luminance components in the diagonal direction, the chrominance signal S122 itself is output as a chrominance signal S459.

Then, the chrominance signal S459 is subtracted from the composite video signal S102 to obtain a luminance signal S123.

According to the fourth embodiment of the invention, correlation of chrominance signal components in the vertical direction and correlations of luminance signal components in the vertical direction and in the diagonal direction are detected from the band-restricted video signals among the three lines of inputted composite video signals, by the luminance diagonal correlation detection circuit 141, the luminance vertical correlation detection circuit 245, and the vertical chrominance correlation detection circuit 356. When the chrominance components have no correlation in the vertical direction and the luminance components do not have correlation in the vertical direction but have correlation in the diagonal direction, the characteristics of the band pass filters are switched so as to narrow the bands of the signals to be output from the three-line chrominance separation circuit, thereby to minimize the circuit scale of the narrow-band pass filter. Further, in the case where luminance signal components in only the diagonal direction, such as diagonal stripes, are input to the three-line chrominance separation circuit 123, when the bands of signals to be output are narrowed, if even a little amount of luminance components and chrominance components can be detected in the vertical direction, this detection result is taken with priority to suppress narrowing of the bands to be output from the chrominance separation circuit 123, whereby the accuracy of operation for reducing cross color in the chrominance signal to be output can be increased, and improvement of resolution in the diagonal direction of the luminance signal to be output can be achieved more accurately.

While in this fourth embodiment three kinds of correlations, i.e., correlation of chrominance signal components in the vertical direction, and correlations of luminance signal components in the vertical direction and in the diagonal direction, are detected, only correlation of diagonal components of the luminance signal may be detected as described for the first embodiment, or diagonal components of the luminance signal and correlation of the luminance signal components in the vertical direction may be detected as described for the second embodiment.

Further, the degree of detectable chrominance correlation in the vertical direction can be varied by adaptively changing the judgement level S356 in the vertical chrominance correlation detection circuit 356.

Furthermore, while in the first to third embodiments an A/D converted NTSC signal is described as an example of an input signal, an A/D converted PAL signal may be employed.

Moreover, while in the first to third embodiments the luminance signal/chrominance signal separation device is implemented by hardware only, it may be implemented by executing software corresponding to the luminance signal/chrominance signal separation method described above, using a microcomputer or digital signal processor, with the same effects as mentioned above.

What is claimed is:

1. A luminance signal/chrominance signal separation device comprising:
    a chrominance separation unit for separating a chrominance signal from an inputted composite video signal;
    a luminance separation unit for separating a luminance signal by subtracting the chrominance signal which is separated by the chrominance separation unit, from the composite video signal;
    a luminance diagonal component detection unit for detecting diagonal components of the luminance signal from the composite video signal; and
    a passband switching unit for switching a passband of a band restriction filter which is provided at an input stage of the chrominance separation unit, according to a result of detection by the luminance diagonal component detection unit.

2. A luminance signal/chrominance signal separation device as defined in claim 1, wherein
    the band restriction filter comprises a broad-band pass filter having a broad passband, and a narrow-band pass filter having a narrow passband; and
    the passband switching unit selects the narrow-band pass filter when the luminance signal has many diagonal components, and selects the broad-band pass filter when the luminance signal has few diagonal components.

3. A luminance signal/chrominance signal separation device as defined in claim 2, wherein
    the band restriction filter comprises a broad-band pass filter having a broad passband, and a narrow-band pass filter having a narrow passband, which filters are connected in series in this order; and
    the passband switching unit selects either an output signal from the broad-band pass filter or an output signal from the narrow-band pass filter, thereby switching band pass characteristics of the band restriction filter.

4. A luminance signal/chrominance signal separation device as defined in claim 1, wherein
    the chrominance separation unit includes:
        first and second inversion units for inverting composite video signals in lines before and after a composite video signal in a reference line to be a reference when performing chrominance separation, respectively; and
        an intermediate value detection unit for detecting an intermediate value between a maximum value and a minimum value among output signals from the first and second inversion units and the composite video signal in the reference line, and outputting the intermediate value as a chrominance signal.

5. A luminance signal/chrominance signal separation device as defined in claim 4, wherein
    the intermediate value detection unit includes:
        a first minimum value unit and a first maximum value unit for detecting a minimum value and a maximum value between the output signal from the first inversion unit and the composite video signal in the reference line;
        a second minimum value unit and a second maximum value unit for detecting a minimum value and a maximum value between the output signal from the second inversion unit and the composite video signal in the reference line;
        a third minimum value unit and a third maximum value unit for detecting a minimum value and a maximum value between an output signal from the first minimum value unit and an output signal from the second minimum value unit;
        a fourth minimum value unit and a fourth maximum value unit for detecting a minimum value and a maximum value between an output signal from the first maximum value unit and an output signal from the second maximum value unit;
        a first addition unit for adding an output signal from the third minimum value unit and an output signal from the fourth maximum value unit;
        a one-half unit for halving an output signal from the first addition unit;
        a fifth minimum value unit for detecting a minimum value between an output signal from the third maximum value unit and an output signal from the one-half unit;
        a sixth minimum value unit for detecting a minimum value between an output signal from the fourth minimum value unit and the output signal from the one-half unit;
        a seventh minimum value unit for detecting a minimum value between the output signal from the third maximum value unit and the output signal from the fourth minimum value unit; and
        a fifth maximum value unit for detecting a maximum value among output signals from the fifth, sixth, and seventh minimum value units, thereby separating a chrominance signal.

6. A luminance signal/chrominance signal separation device as defined in claim 1, wherein
    the luminance diagonal component detection unit includes:
        a diagonal difference detection unit for detecting a diagonal difference that is the size of a difference between signal components which deviate from each other in the diagonal direction, in composite video signals in lines before and after a reference line to be a reference when performing chrominance separation; and a diagonal component judgement unit for judging the presence/absence of luminance diagonal components by comparing the diagonal difference detected by the diagonal difference detection unit with a first judgement level.

7. A luminance signal/chrominance signal separation device as defined in claim 6, wherein the diagonal difference detection unit includes:

second and third addition units for adding the composite video signal in the reference line to the composite video signals in the lines before and after the reference line, respectively;

first and second delay units for delaying data outputted from the second and third addition units, respectively;

first and second difference units for taking differences in data between the outputs of the second and third addition units, and the outputs of the second and first delay units, respectively; and first and second absolute value units for taking absolute values of the difference values obtained by the first and second difference units, respectively; and the diagonal component judgement unit includes:

first and second comparators for comparing the first and second absolute value levels obtained by the first and second absolute value units, with the first judgement level, respectively; and a first logic unit for calculating a logical OR of the first and second comparison results obtained by the first and second comparators, respectively, thereby detecting diagonal components of the luminance signal included in the composite video signal.

8. A luminance signal/chrominance signal separation device as defined in claim 1, further comprising:

a vertical luminance correlation detection unit for detecting luminance signal components in the vertical direction between lines before and after a reference line to be a reference when the chrominance separation unit performs chrominance separation on the inputted composite video signal;

wherein, when the vertical luminance correlation detection unit judges that a correlation of the luminance signal component between the lines is high, the passband of the band restriction filter is not narrowed.

9. A luminance signal/chrominance signal separation device as defined in claim 8, wherein the vertical luminance correlation detection unit includes:

a vertical difference detection unit for detecting a vertical difference that is the size of a difference between signal components which deviate from each other in the vertical direction, in the composite video signals in the lines before and after the reference line; and a vertical correlation judgement unit for judging the presence/absence of a luminance vertical correlation by comparing the vertical difference detected by the vertical difference detection unit with a second judgement level.

10. A luminance signal/chrominance signal separation device as defined in claim 9, wherein the vertical difference detection unit includes:

a third difference unit for taking a difference between the signals in the lines before and after the reference line; and a third absolute value unit for taking an absolute value of an output signal from the third difference unit; and the vertical correlation judgement unit includes:

a third comparator for comparing an output signal from the third absolute value unit with the second judgement level, thereby detecting a correlation in the vertical direction of the luminance signal included in the composite video signal.

11. A luminance signal/chrominance signal separation device as defined in claim 8 further comprising:

a second logic unit for calculating a logical AND between a negative logic of a detection result of the vertical luminance correlation detection unit and a positive logic of a detection result of the luminance diagonal component detection unit, and outputting the logical AND signal as a switching control signal to the passband switching unit, instead of the detection result of the luminance diagonal component detection unit.

12. A luminance signal/chrominance signal separation device as defined in claim 8 further comprising:

a vertical chrominance correlation detection unit for detecting chrominance signal components in the vertical direction between the lines before and after the reference line;

wherein, when a correlation of the chrominance signal between the lines is high, the passband of the band restriction filter is not narrowed.

13. A luminance signal/chrominance signal separation device as defined in claim 12, wherein the vertical chrominance correlation detection unit includes:

third and fourth inversion units for inverting the composite video signals in the lines before and after reference line, respectively;

an inter-adjacent-line vertical difference detection unit for detecting an inter-adjacent-line vertical component that is the size of a difference between signal components which deviate from each other in the vertical direction, in the composite video signals in the reference line and the lines before and after the reference line; and an inter-adjacent-line vertical correlation judgement unit for judging the presence/absence of a vertical chrominance correlation by comparing the inter-adjacent-line vertical difference that is detected by the inter-adjacent-line vertical difference detection unit with a third judgement level.

14. A luminance signal/chrominance signal separation device as defined in claim 13, wherein the inter-adjacent-line vertical difference detection unit includes:

fourth and fifth difference units for obtaining differences between the signal in the reference line and output signals from the third and fourth inversion units, respectively; and fourth and fifth absolute value units for taking absolute values of output signals from the fourth and fifth difference units, respectively; and the inter-adjacent-line vertical correlation judgement unit includes:

fourth and fifth comparators for comparing output signals from the fourth and fifth absolute value units with the third judgement level, respectively; and a third logic unit for calculating a logical OR of the fourth and fifth comparison results obtained by the fourth and fifth comparators, thereby detecting a vertical correlation of the chrominance signal included in the composite video signal.

15. A luminance signal/chrominance signal separation device as defined in claim 12 further comprising, a fourth logic unit for calculating a logical AND among a negative logic of a detection result of the vertical luminance correlation detector, a negative logic of a detection result of the vertical chrominance correlation detector, and a positive logic of a detection result of the luminance diagonal component detection unit, and outputting the logical AND signal as a switching control signal to the passband switching unit, instead of the output signal from the luminance diagonal component detection unit.

16. A luminance signal/chrominance signal separation device as defined in claim 12, wherein
the band restriction filter is provided in an output stage of the chrominance separation unit, instead of providing it in the input stage thereof.

17. A luminance signal/chrominance signal separation device as defined in claim 16, wherein
the band restriction filter comprises a broad-band pass filter having a broad passband, and a narrow-band pass filter having a narrow chrominance passband;
the broad-band pass filter is provided at an input side of the chrominance separation unit, and the narrow-band pass filter is provided at an output side of the chrominance separation filter; and
the passband switching unit selects either an output of the chrominance separation unit, which has passed through the narrow-band pass filter, or an output of the chrominance separation unit, thereby switching the band pass characteristics of the band restriction filter.

18. A luminance signal/chrominance signal separation method comprising:
detecting diagonal components of a luminance signal from an inputted composite video signal;
switching a passband of a band restriction filter that is provided at an input stage of a chrominance signal separation unit which separates a chrominance signal according to a detection result of the luminance diagonal components;
separating the chrominance signal from the composite video signal whose passband is switched; and
separating the luminance signal by subtracting the separated chrominance signal from the composite video signal.

19. A luminance signal/chrominance signal separation method comprising:
detecting diagonal components and vertical components of a luminance signal from an inputted composite video signal;
switching a passband of a band restriction filter provided in an input stage of a chrominance signal separation unit for separating a chrominance signal according to the result of detection of the luminance diagonal components and luminance vertical components;
separating the chrominance signal from the composite signal whose passband is switched; and
separating the luminance signal by subtracting the separated chrominance signal from the composite video signal.

20. A luminance signal/chrominance signal separation method comprising:
detecting diagonal components and vertical components of a luminance signal, and chrominance components in the vertical direction, from an inputted composite video signal;
switching a passband of a band restriction filter in an input stage of a chrominance signal separation unit for separating a chrominance signal according to the result of detection of the luminance diagonal components, luminance vertical components, and chrominance components in the vertical direction;
separating the chrominance signal from the composite video signal whose passband is switched; and
separating the luminance signal by subtracting the separated chrominance signal from the composite video signal.

21. A luminance signal/chrominance signal separation method comprising:
detecting diagonal components and vertical components of a luminance signal, and chrominance components in the vertical direction, from an inputted composite video signal;
switching a passband of a band restriction filter provided at an output stage of a chrominance signal separation unit for separating a chrominance signal according to the result of detection of the luminance diagonal components, luminance vertical components, and chrominance components in the vertical direction;
separating a chrominance signal whose passband is switched, from the composite video signal; and
separating the luminance signal by subtracting the separated chrominance signal from the composite video signal.

* * * * *